United States Patent
D'Aluisio

(10) Patent No.: US 7,562,942 B2
(45) Date of Patent: Jul. 21, 2009

(54) BICYCLE WHEEL AND RELEASE MECHANISM

(75) Inventor: Chris D'Aluisio, Watsonville, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 284 days.

(21) Appl. No.: 11/404,128

(22) Filed: Apr. 14, 2006

(65) Prior Publication Data

US 2007/0145814 A1 Jun. 28, 2007

Related U.S. Application Data

(60) Provisional application No. 60/754,026, filed on Dec. 22, 2005.

(51) Int. Cl.
*B60B 35/00* (2006.01)

(52) U.S. Cl. .................... 301/124.2; 280/279

(58) Field of Classification Search ............ 301/111.01, 301/118–119, 121, 111.03, 124.2; 280/279
See application file for complete search history.

(56) References Cited

U.S. PATENT DOCUMENTS

| 300,737 | A |   | 6/1884  | Rowlett          |         |
|---------|---|---|---------|------------------|---------|
| 456,815 | A |   | 7/1891  | Hartmann         |         |
| 459,699 | A |   | 9/1891  | Duryea           |         |
| 686,463 | A |   | 11/1901 | Lee              |         |
| D157,539| S |   | 2/1950  | Rosten           |         |
| 3,241,894| A|   | 3/1966  | Duffy            |         |
| D255,772| S | * | 7/1980  | Johnson et al.   | D8/331  |
| 4,626,036| A|   | 12/1986 | Hinsberg         |         |
| 4,930,843| A|   | 6/1990  | Lewis            |         |
| 5,090,855| A| * | 2/1992  | Terry            | 411/144 |
| 5,301,778| A|   | 4/1994  | Haeussinger      |         |
| 5,332,295| A|   | 7/1994  | Vogel et al.     |         |
| D350,088| S |   | 8/1994  | Inatani          |         |
| 5,445,439| A|   | 8/1995  | Dietrich         |         |
| D364,842| S |   | 12/1995 | Hoeppner et al.  |         |
| 5,487,592| A|   | 1/1996  | Rasmussen        |         |
| 5,673,925| A| * | 10/1997 | Stewart          | 280/279 |
| 5,810,453| A|   | 9/1998  | O'Brien          |         |

(Continued)

FOREIGN PATENT DOCUMENTS

EP 1122091 8/2001

OTHER PUBLICATIONS

International Search Report and Written Opinion for Application No. PCT-US2006-048512 (the PCT counterpart of the parent application) mailed Aug. 24, 2007.

*Primary Examiner*—Jason R Bellinger
(74) *Attorney, Agent, or Firm*—Knobbe, Martens, Olson & Bear, LLP

(57) ABSTRACT

A bicycle wheel release mechanism can be configured to fit between dropouts on a bicycle. The release mechanism can have a ramp member and a ramp interface that rotate relative to one another to define a secured position where the wheel is secured to a bicycle and an open position where the wheel is releasable from the bicycle. The ramp member can be keyed to the bicycle such that the release mechanism can be operated or adjusted via single-handed operation. The ramp member can be configured with a variable angle ramp to facilitate rapid application for initial rotation of the mechanism followed by slower application as clamping forces increase when the release mechanism approaches the secured position.

21 Claims, 21 Drawing Sheets

U.S. PATENT DOCUMENTS

| | | | |
|---|---|---|---|
| 5,813,258 A * | 9/1998 | Cova et al. | 70/225 |
| 5,882,088 A | 3/1999 | Yahata | |
| 5,931,544 A | 8/1999 | Dietrich | |
| 5,947,565 A | 9/1999 | Dietrich | |
| 6,010,197 A | 1/2000 | Crosnier et al. | |
| 6,036,281 A | 3/2000 | Campbell | |
| D430,093 S | 8/2000 | Muraoka | |
| D436,337 S | 1/2001 | Yu | |
| 6,196,638 B1 | 3/2001 | Mizuno et al. | |
| 6,238,008 B1 | 5/2001 | Forsythe | |
| 6,244,667 B1 | 6/2001 | Dietrich | |
| 6,354,669 B1 | 3/2002 | Tabe | |
| 6,382,734 B1 | 5/2002 | Passarotto | |
| 6,409,278 B1 | 6/2002 | Nakajima | |
| 6,409,279 B1 | 6/2002 | Chen | |
| 6,409,282 B1 | 6/2002 | Nakajima et al. | |
| 6,428,113 B2 | 8/2002 | Dietrich | |
| 6,431,658 B1 | 8/2002 | Nakajima et al. | |
| 6,443,532 B1 | 9/2002 | Cheng et al. | |
| 6,497,314 B2 | 12/2002 | Kanehisa | |
| 6,511,133 B1 | 1/2003 | Tabe | |
| 6,517,169 B1 | 2/2003 | Yu | |
| 6,588,853 B2 | 7/2003 | Okajima | |
| 6,652,037 B2 | 11/2003 | Chen | |
| 6,679,561 B2 | 1/2004 | Addink et al. | |
| 6,722,743 B2 | 4/2004 | Meggiolan | |
| 6,899,401 B2 | 5/2005 | Schlanger | |
| 7,090,308 B2 * | 8/2006 | Rose et al. | 301/110.5 |
| 2003/0057763 A1 | 3/2003 | Dietrich | |
| 2004/0113484 A1 | 6/2004 | Meggiolan | |
| 2004/0227391 A1 | 11/2004 | Passarotto | |
| 2004/0262983 A1 | 12/2004 | Tanaka | |
| 2005/0012384 A1 | 1/2005 | Fioravanti | |
| 2005/0067881 A1 | 3/2005 | Schlanger | |

* cited by examiner

BICYCLE WHEEL AND RELEASE MECHANISM

CROSS-REFERENCE TO RELATED APPLICATIONS

This application claims the benefit of U.S. Provisional Patent Application No. 60/754,026, entitled "BICYCLE WHEEL AND HUB," filed on Dec. 22, 2005.

Also, this application hereby incorporates by reference the above-identified provisional application, in its entirety.

BACKGROUND OF THE INVENTION

1. Field of the Invention

This application relates generally to a bicycle wheel and hub and, more specifically, to a release mechanism for a bicycle wheel.

2. Description of the Related Art

Bicycle wheels have long included a wheel rim connected to a generally cylindrical hub by multiple spokes extending radially outward from the hub. A traditional spoked bicycle wheel is illustrated in FIG. 21, and has a rim 210, a hub 220, and a plurality of spokes 250 extending therebetween. Various wheel configurations have been attempted to achieve desirable wheel attributes of reduced weight, reduced aerodynamic drag, or increased lateral stiffness over a traditional spoked bicycle wheel. However, these proposed improvements typically result in certain drawbacks.

For example, in a typical attempted light weight wheel, a reduction in weight requires a corresponding reduction in wheel stiffness. Conversely, with an attempted increased rigidity wheel, such as by increasing the number or size of spokes, increased weight and increased aerodynamic drag are often undesirable by-products of the increased rigidity.

Often, attempts to decrease aerodynamic drag, such as by incorporation of an aerodynamically sculpted "tall" rim, or incorporation of a single disk in the place of spokes, have undesirable side effects. For example, while aerodynamic drag may be reduced with a tall rim or disk wheel, the rideability of these wheels suffers. Wheels with tall rims or disk wheels are difficult for a rider to control in side winds. They also often have a higher moment of inertia than a traditional spoked wheel, so require more energy to accelerate to a given rotational speed. Moreover, tall-rimmed wheels are often relatively vertically stiff, and therefore transmit even small bumps and surface irregularities to the rider, resulting in a harsh ride.

Bicycle wheels are often coupled to dropouts on a bicycle frame or frame fork by a release mechanism. Typical release mechanisms include a rod having end nuts with surfaces suitable to clamp on the dropouts and a cam mechanism to place the rod in tension between the dropouts and compress the wheel hub between the dropouts. The cam mechanism is typically positioned outside of the dropout, where it is subject to contact by debris, obstacles, or other bicycles. In many release mechanisms, the clamping force exerted by the cam can be adjusted by tightening or loosening an adjustable end nut. However, this adjustment requires a two-handed operation on often dirty or greasy wheel components.

SUMMARY OF THE INVENTION

In light of the above discussion of related art, there is a need in the art for a wheel that achieves reduced weight, reduced aerodynamic drag, and increased lateral stiffness without significant drawbacks in rideability or other desirable attributes.

In various embodiments, bicycle wheels, hubs, and release mechanisms described in further detail herein meet this need. In various embodiments, a bicycle wheel has a hub with a hub flange on each end. Each flange comprises a plurality of extensions extending towards the rim from a central body of the hub. A pair of spokes desirably span from each of these hub flange extensions to the rim. The resulting reduced spoke length, combined with the rigidity from the shared two-spoke per hub flange extension structure, greatly increases lateral stiffness of the wheel as compared to a traditional spoked wheel. The flanged hub can desirably be constructed from a stiff but lightweight material such as a carbon fiber composite so that the wheel's weight is not significantly increased along with the stiffness. In various embodiments, the increased stiffness of the hub flange extension structure can be exploited to reduce aerodynamic drag. For example, in certain embodiments, the number of spokes can be reduced. In other embodiments, the distance across the hub between ends of the spokes can be reduced to reduce the frontal area of the wheel. Therefore, bicycle wheels overcoming the shortcomings of the prior art and having increased stiffness, reduced weight, and reduced aerodynamic drag are further disclosed herein.

In certain embodiments, a bicycle wheel assembly comprises a wheel rim, a hub positioned at approximately a rotational center of the wheel rim, and a plurality of spokes extending between the hub and the rim. The hub comprises a central body and a first hub flange. The central body has a first end and a second end. The first hub flange extends radially outward toward the rim from the central body near the first end. The plurality of spokes comprises a first set of spokes and a second set of spokes. The first set of spokes extends from the first hub flange to the rim. The second set of spokes extends from the hub near the second end of the central body to the rim. The first hub flange extends at least approximately one-fifth of a distance from the central body to the rim such the first set of spokes extending therefrom has a corresponding shortened length.

In other embodiments, a bicycle wheel comprises a wheel rim, a hub positioned approximately at a rotational center of the wheel rim, and a plurality of spokes extending between the hub and the rim. The hub comprises a central body, a first aerodynamic connector, and a first hub flange. The central body has a first end and a second end. The first aerodynamic connector extends axially from one of the first end and the second end of the central body and is configured to couple to a wheel fork of a bicycle. The first hub flange extends radially outward toward the rim from the central body near the first end. The first hub flange comprises a plurality of extensions. The plurality of spokes comprises a first set of spokes extending from the extensions of the first hub flange to the rim and a second set of spokes extending from the hub near the second end of the central body to the rim. The central body and the first aerodynamic connector are sized and configured such that the wheel has a reduced frontal area.

In other embodiments, a wheel hub for a bicycle comprises a central body, a first hub flange, and a second hub flange. The central body has a first end and a second end. The first hub flange extends radially outward from the central body near the first end. The first hub flange comprises a plurality of extensions. The second flange extends radially outward from the central body near the second end. The second hub flange comprises a plurality of extensions. The second hub flange is oriented on the central body angularly offset from the first hub flange. The first hub flange and the second hub flange each extend at least approximately 60 millimeters from the central body. Each of the extensions of the first and second hub flanges is configured to receive a pair of spokes.

In other embodiments, a release mechanism to releasably couple an axle of a bicycle wheel to a bicycle is provided. The release mechanism comprises a skewer configured to pass through the axle of the bicycle wheel, a first engagement member configured to be disposed on the axle, and a second engagement member configured to be disposed on the axle. The skewer defines a longitudinal axis. The first engagement member comprises a radially variable surface. The second engagement member comprises an interface surface configured to cooperate with the radially variable surface. The first engagement member and the second engagement member are rotatable relative to each other about the longitudinal axis of the skewer. The first engagement member and the second engagement member are rotatable between a first position in which the release mechanism is configured to retain the bicycle wheel on the bicycle and a second position in which the bicycle wheel is releasable from the bicycle.

In still other embodiments, a release mechanism to releasably couple an axle of a bicycle wheel to a pair of dropouts on a bicycle is provided. The mechanism comprises a skewer configured to pass through the axle of the bicycle wheel, and a wheel retention mechanism. The skewer defines a longitudinal axis. The wheel retention mechanism is selectively adjustable between a first position in which the release mechanism is configured to retain the bicycle wheel on the dropouts and a second position in which the bicycle wheel is releasable from the dropouts. The wheel retention mechanism is configured to fit between the dropouts on the bicycle when the bicycle wheel is coupled to the bicycle.

In other embodiments, a bicycle wheel is provided. The bicycle wheel comprises a wheel rim, an axle positioned approximately at a rotational center of the wheel rim, a hub, a plurality of spokes extending between the hub and the rim, and a release mechanism to releasably couple the axle of the bicycle wheel to pair of dropouts on a bicycle. The release mechanism comprises a skewer passing through the axle of the bicycle wheel, a first engagement member disposed on the axle, and a second engagement member disposed on the axle. The skewer defines a longitudinal axis. The first engagement member comprises a radially variable surface. The second engagement member comprises an interface surface configured to cooperate with the radially variable surface. The first engagement member and the second engagement member are rotatable relative to each other about the longitudinal axis of the skewer. The first engagement member and the second engagement member are rotatable between a first position in which the release mechanism is configured to retain the bicycle wheel on the bicycle and a second position in which the bicycle wheel is releasable from the bicycle.

DETAILED DESCRIPTION OF THE PREFERRED EMBODIMENT

Figure 21:
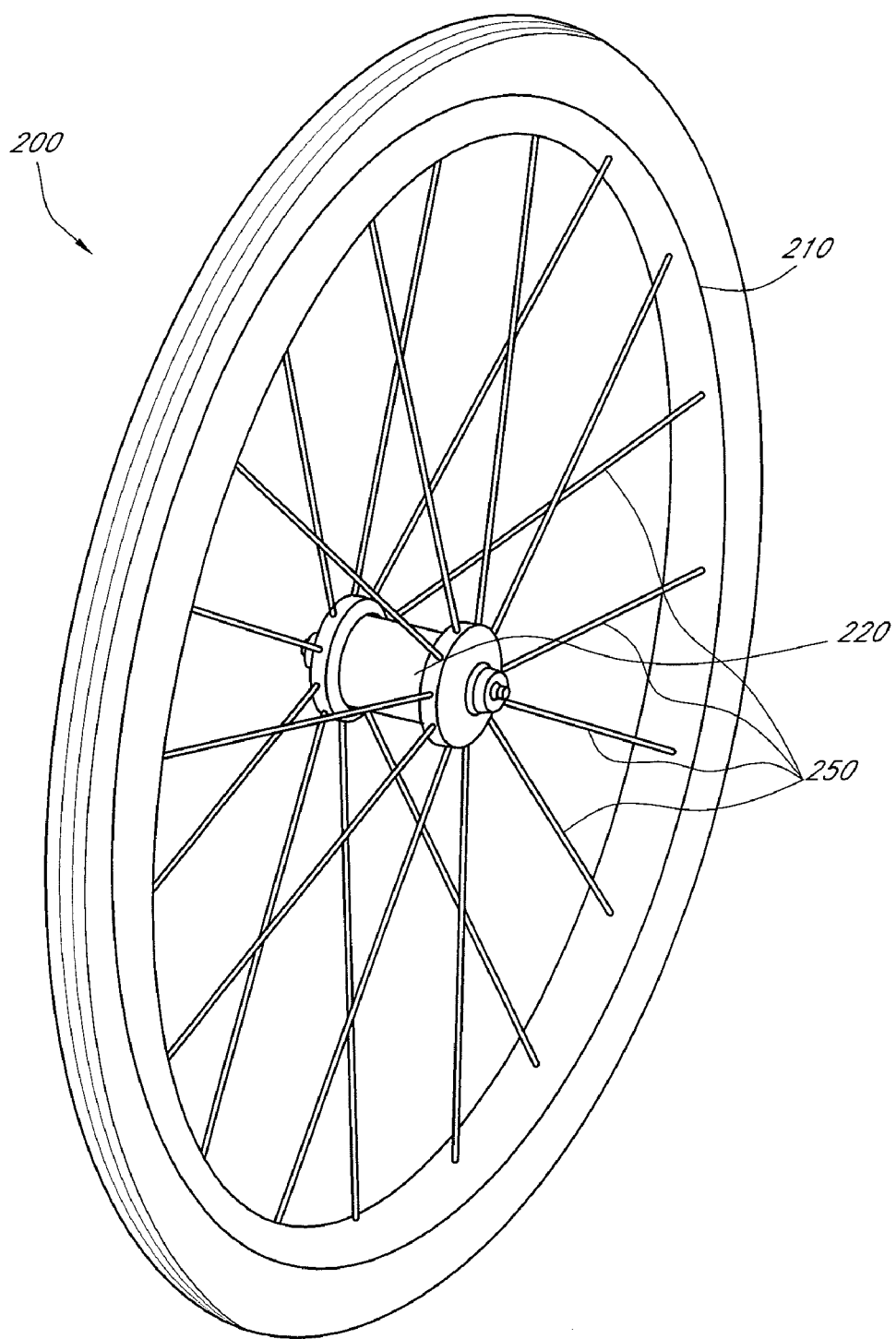
FIG. 21 is a perspective view of a prior art bicycle wheel.

With reference to FIGS. 1-4, various embodiments of bicycle wheel 100 and hub 120 are disclosed that comprise a wheel rim 110, a hub 120 positioned at the approximate rotational center of the wheel rim 110, and a plurality of spokes 150 extending between the hub 120 and the rim 110. The hub 120 has a flanged configuration including a plurality of extensions 132, 142 from each flange 130, 140 resulting in a shorter spoke length as compared to a traditional spoked wheel 200 (FIG. 21). Advantageously, as discussed further below, the reduced spoke length increases the lateral stiffness of the wheel 100 as compared to a traditional spoked wheel 200.

Figure 1:
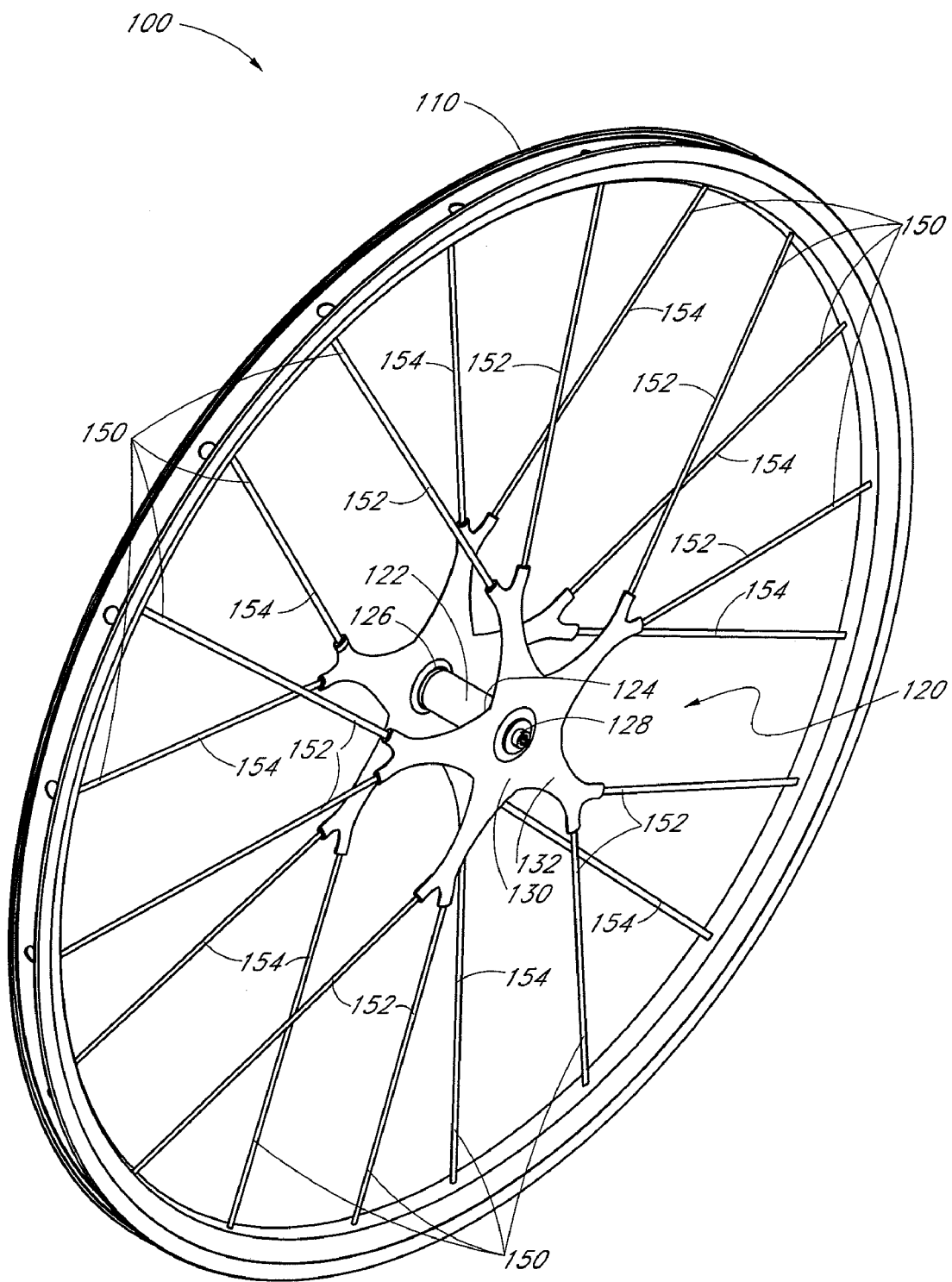
FIG. 1 is a perspective view of a bicycle wheel assembly.
Figure 2:
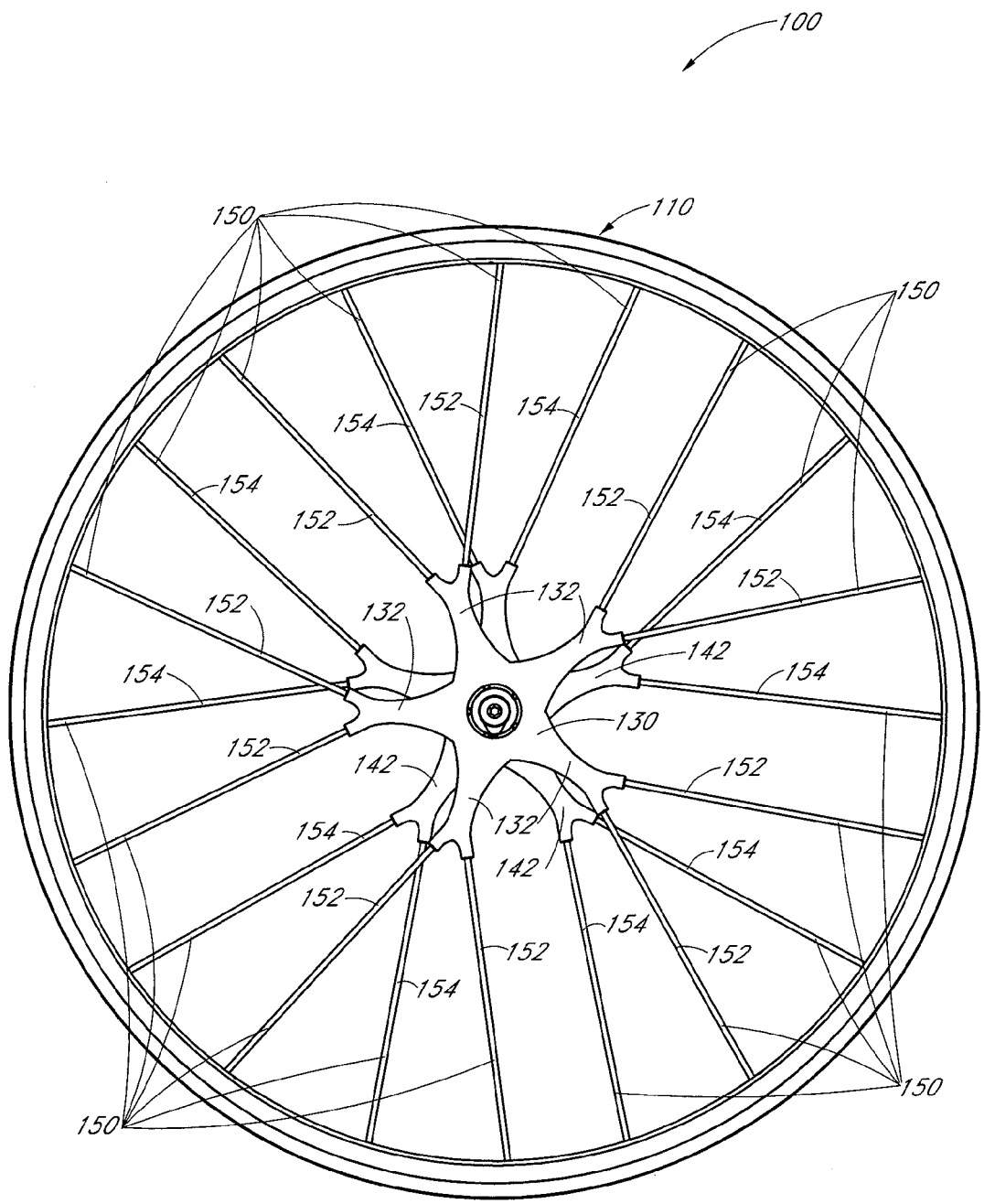
FIG. 2 is a side view of the bicycle wheel assembly of FIG. 1.

FIG. 1 depicts a perspective view of a bicycle wheel 100 having a rim 110 configured to support a tire. FIG. 2 depicts a side view of the wheel of FIG. 1. Various known rim configurations may be incorporated into a wheel 100 as depicted. For example, the rim 110 desirably has a generally circular profile when viewed from the side as in FIG. 2, but may have a non-circular profile configured to be flexed into a generally circular profile upon tensioning of a plurality of spokes. If reduced aerodynamic drag is desired, the rim 110 can have a tall, aerodynamic profile, although, as noted above, a tall rim may adversely impact rideability.

A plurality of spokes 150 extend from the hub 120 to the rim 110. Ends of the spokes 150 that extend to the rim 110 are desirably threaded. The rim 110 may include spoke nipples either extending radially inward from an inner surface of the rim 110, or, where reduced aerodynamic drag is desired, integrated in the rim 110 itself. The spoke nipples include threaded recesses to mate with the threaded ends of the spokes 150 such that the tension on the spokes can be individually adjusted by rotation of the spoke nipple.

With reference to FIG. 1, the wheel 100 includes a hub 120 positioned at the approximate rotational center of the rim 110. As illustrated, the hub 120 includes a central body 122, a first hub flange 130 and a second hub flange 140. The hub 120 is configured to be mounted to a fork of a bicycle frame. The hub 120 is desirably constructed of a strong and lightweight material. For example, the hub 120 may be formed of a carbon fiber composite, aluminum, or an aluminum alloy. The central body 122, the first hub flange 130, and the second hub flange 140 may be integrally formed as a single unit, or they may be individually formed and joined to form an assembly. Where the central body 122, and the hub flanges 130, 140 are individually formed, they may each be of different, though desirably lightweight and strong, materials. For example, the hub flanges 130, 140 may each be constructed of a carbon fiber composite and the central body may be aluminum or an aluminum alloy.

The central body 122 of the hub 120 is desirably a generally cylindrical member having a first end 124 and a second end 126. As depicted, the first and second ends 124, 126 are flared where they join the first hub flange 130 and the second hub flange 140. The central body desirably has a longitudinal axis that defines an axis of rotation of the wheel. In some embodiments, the central body has end fittings 128 at the first and second ends 124, 126 that are configured to be connected to a wheel fork on a bicycle frame.

As depicted in FIG. 1, the wheel 100 includes a first hub flange 130 extending radially outward from the central body 122 at a location near the first end 124. The wheel 100 desirably also includes a second hub flange 140 extending radially outward from the central body 122 at a location near the second end 126. In the depicted embodiments, the hub flanges 130, 140 are configured substantially identically to each other and oriented on the hub 120 angularly offset from each other such that the plurality of spokes 150 meet the rim 110 in an alternating arrangement wherein spokes from the first hub flange 130 alternate with spokes from the second hub flange 140. But, it is contemplated that in other embodiments, the first and second hub flanges 130, 140 could be configured structurally differently from one another, or the wheel 100 could have only one hub flange at one end of the hub 120 and another structure at an opposite end of the hub 120.

Figure 3:
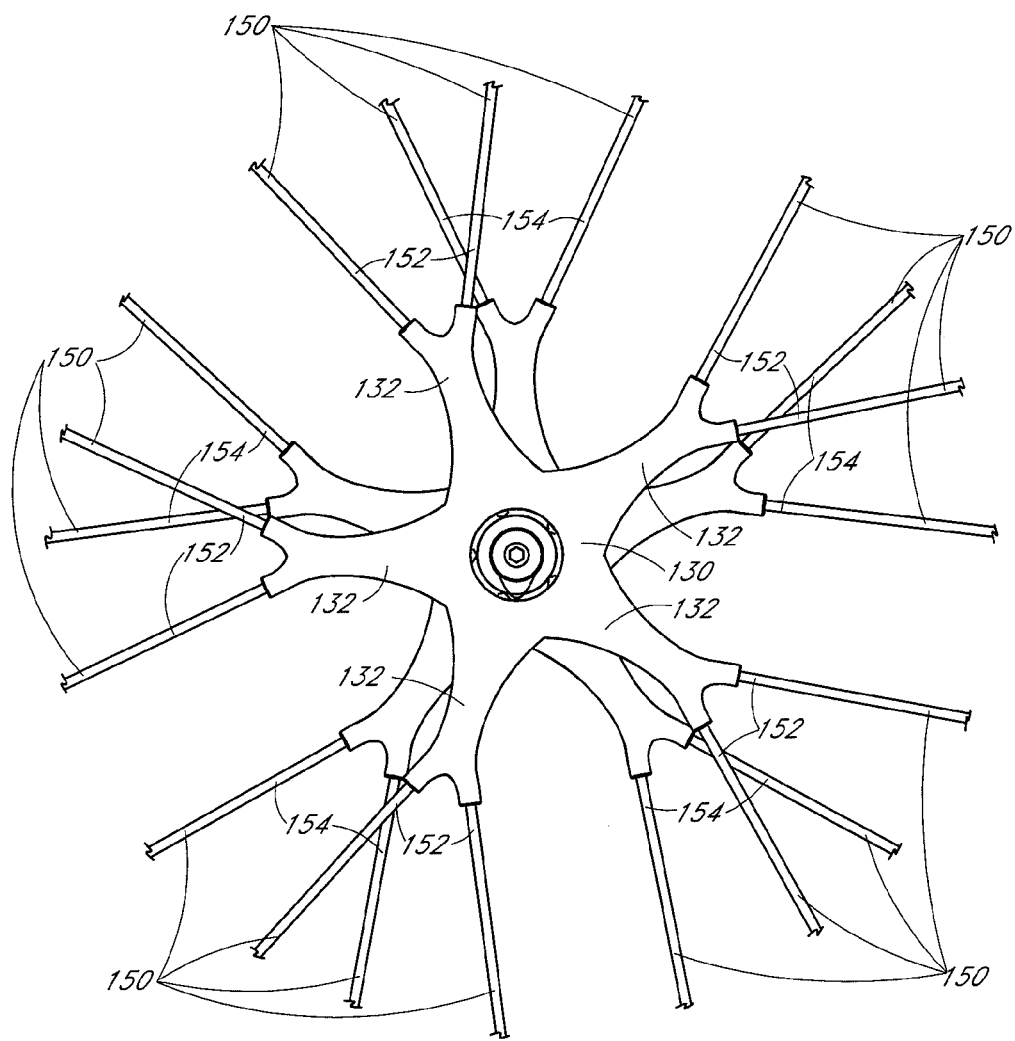
FIG. 3 is a perspective view of a hub flange of the bicycle wheel assembly of FIG. 1.
Figure 4:
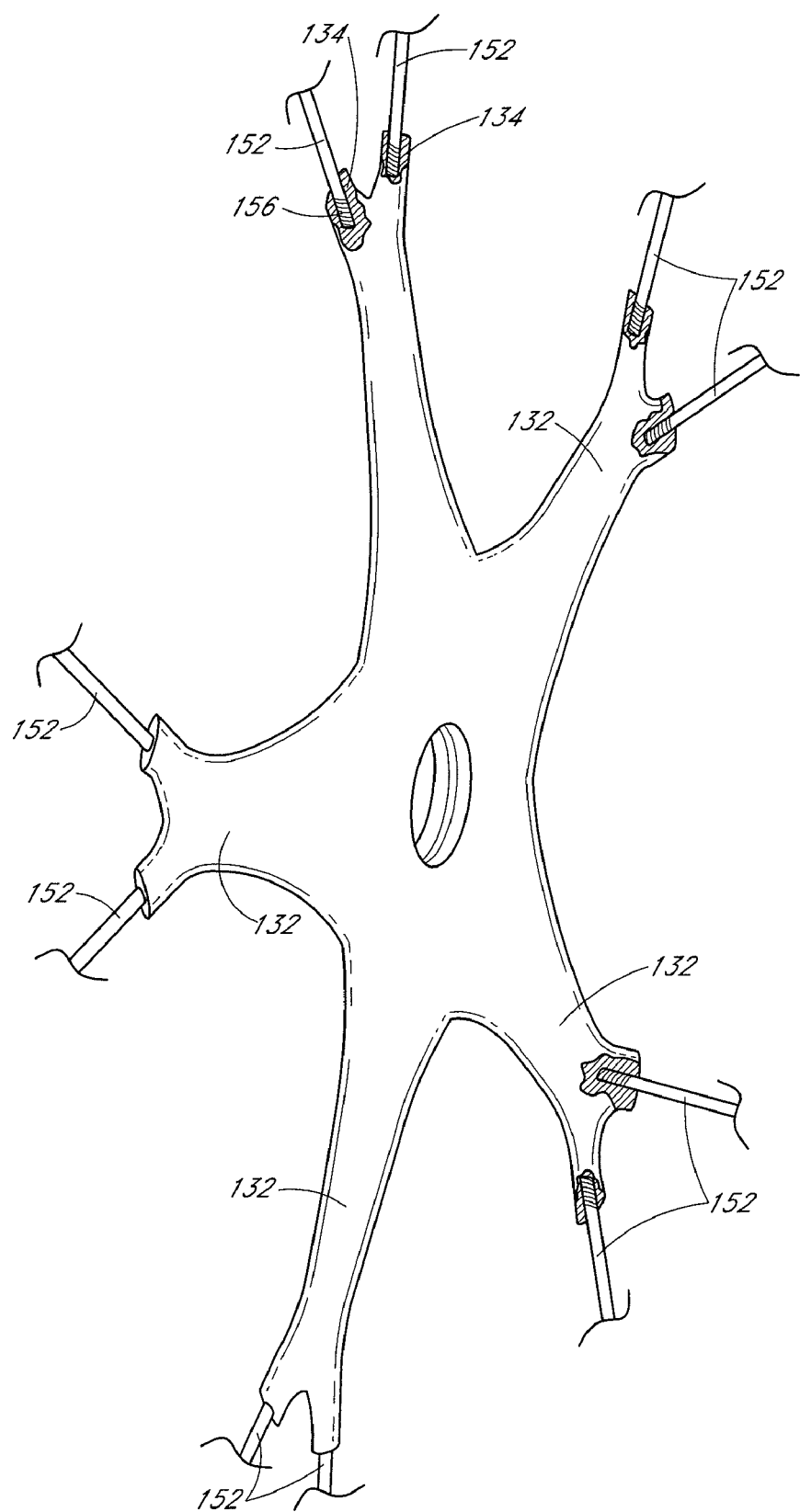
FIG. 4 is a cut away perspective view of the hub flange of FIG. 3.

With reference to FIGS. 2, 3, and 4, the first hub flange 130 is shown in detail. As depicted, the first hub flange 130 includes a plurality of extensions 132 extending radially outwardly from a central region of the hub flange 130. The second hub flange 140 likewise includes a plurality of extensions 142. A radially outer edge of the extensions 132 define a radially outer edge of the first hub flange 130. As illustrated, the first hub flange 130 comprises five extensions 132. It is contemplated that in other embodiments, the first hub flange 130 could comprise more or fewer than five extensions 132.

Desirably, the extensions 132 are equally angularly spaced about the hub such that in the illustrated five-extension embodiment each extension 132 is approximately 72 degrees apart from each other extension 132. Each extension 132 protrudes radially outward from the central body 122 towards the rim 110. In certain embodiments, the extensions 132 extend at least approximately one-fifth the distance from the central body 122 to the rim 110. In other embodiments, the extensions 132 extend at least approximately one-third the distance from the central body 122 to the rim 110. Desirably, the extensions 132 protrude radially outwardly from approximately 80 mm to approximately 120 mm from an outer surface of the central body 122. The extension of the hub flanges 130, 140 allows for shorter spokes 150 to be included in the wheel 100. A reduction in spoke length corresponds to an increase in lateral stiffness of the wheel 100.

With reference to FIGS. 3 and 4, each extension 132 is configured to receive a pair of spokes 150. However, it is recognized that in other embodiments, each extension 132, or some of the extensions 132 could receive more than two spokes 150, or could receive only a single spoke 150. Desirably, each extension 132 is strong and stiff enough to handle a collective maximum load imparted by both of the pair of spokes. When a bicycle is supporting a rider's weight or another load and the wheels are in motion, at a given instant, only a single spoke has a maximum load applied to it. Therefore, since each extension 132 is configured to support a load from two spokes, the effective stiffness of any one spoke (and therefore the lateral stiffness of the wheel overall) is increased as the maximum load on a single spoke will be shared with the extension 132 connected to that spoke.

With reference to FIG. 4, the extensions 132 may each include a pair of threaded regions 134 that are configured to receive a pair of spokes 150 having correspondingly threaded ends 156. Advantageously, spokes 150 with threaded ends 156 provide quick and easy assembly, disassembly, and repair of a wheel 100.

With reference to FIGS. 1 and 2, a plurality of spokes 150 extends between the hub flanges 130, 140 and the rim 110. The plurality of spokes 150 comprises a first set 152 of spokes and a second set 154 of spokes. The first set 152 of spokes extends from the first hub flange 130 to the rim 110, and the second set of spokes 154 extends from the second hub flange 140 to the rim 110. As noted above, since the spokes 150 extend from a radially outer edge of the flanges 130, 140 to the rim 110, they have a reduced length as compared to a traditional spoked wheel 200 in which the spokes 250 extend from a small hub 220 to a rim 210 (FIG. 21). Advantageously, this reduced spoke length contributes to improved lateral stiffness of the wheel 100. As noted above, the flange extensions 132, 142 are each configured to support a maximum collective tensile load from a pair of spokes 150, but only experience a maximum load from one of the pair of spokes at any given instant.

In the illustrated embodiments, the first set 152 and second set 154 of spokes each comprise a plurality of pairs of spokes corresponding to the plurality of extensions 132, 142 of the hub flanges 130, 140. Therefore, in the illustrated five-extension embodiments, the wheel 100 comprises twenty spokes 150. A twenty-spoke wheel has a reduced number of spokes as compared to a traditional bicycle wheel 200, advantageously reducing the aerodynamic drag on the wheel caused by the spokes 150. Further, the paired configuration of spokes extending from extensions on the hub flanges reduces the total spoke length presented by the wheel that creates aerodynamic drag. For example, in an embodiment of wheel 100 having twenty spokes 150 where pairs of spokes 150 extend from hub flange extensions 132, 142 extending approximately ⅓ a distance from the central body 122 of the hub 120 to the rim 110, the total spoke length presented to the air is reduced by approximately 16.6% over a wheel having twenty spokes extending the entire distance from the hub to the rim. The illustrated embodiment of wheel 100 presents to the air twenty ⅔ length segments (the shortened spokes 150) and ten ⅓ length segments (the hub flange extensions 132, 142) as compared with the twenty full length spokes presented by a wheel with hub-to-rim spokes. Since as discussed above, the shortened spoke length and extended hub flanges 130, 140 contribute to the lateral stiffness of the wheel 100, this reduction in aerodynamic drag does not require a compromise in wheel rigidity or rideability.

The spokes 150 may have a generally cylindrical profile such that they have a generally circular profile in cross section. Alternatively, for reduced aerodynamic drag, they may have a non-circular profile such as an oval or a flattened oval.

As discussed above, both a hub end (illustrated in FIG. 4) and a rim end of the spokes 150 are desirably threaded to allow quick assembly, disassembly, or repair of the wheel 100. Spoke nipples or other fittings may be included on the rim to allow the tension in each spoke to be individually adjusted. The spokes 150 may be constructed of a metal such as steel or a steel alloy. Alternatively, the spokes 150 may be constructed of a carbon fiber composite material. In certain embodiments, where the spokes are constructed of carbon fiber 150, each pair of spokes extending from a hub flange extension 132, 142 may comprise a single carbon fiber segment having an angular bend at an approximate midpoint. This angular bend is retained by the hub flange extension 132, 142. Where the hub flanges 130, 140 are also formed of a carbon fiber composite, the extensions 132, 142 of the hub flanges 130, 140 can be formed around the angular bends in the carbon fiber composite segments forming the spokes 150.

Figure 5:
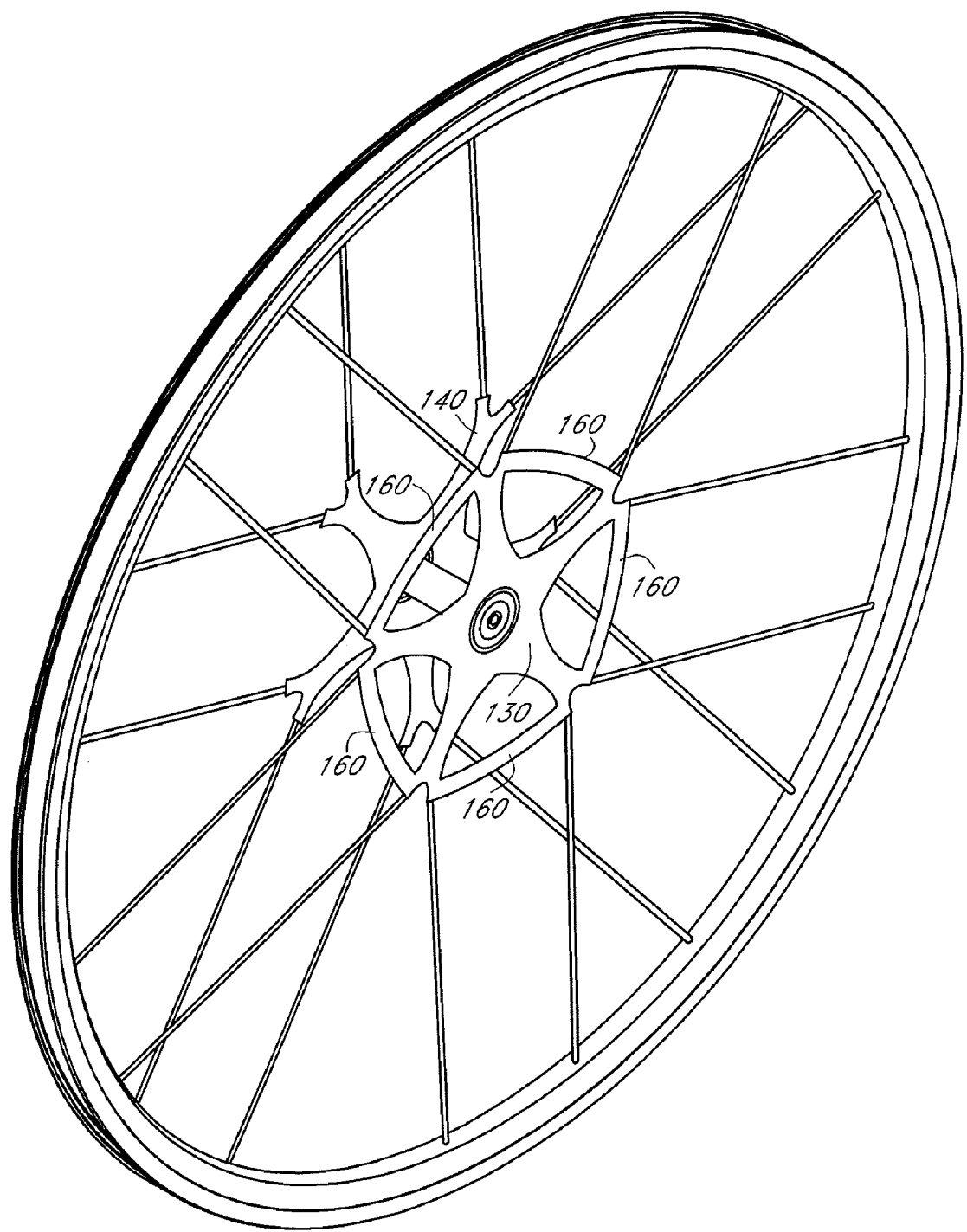
FIG. 5 is a perspective view of another embodiment of bicycle wheel assembly.
Figure 6:
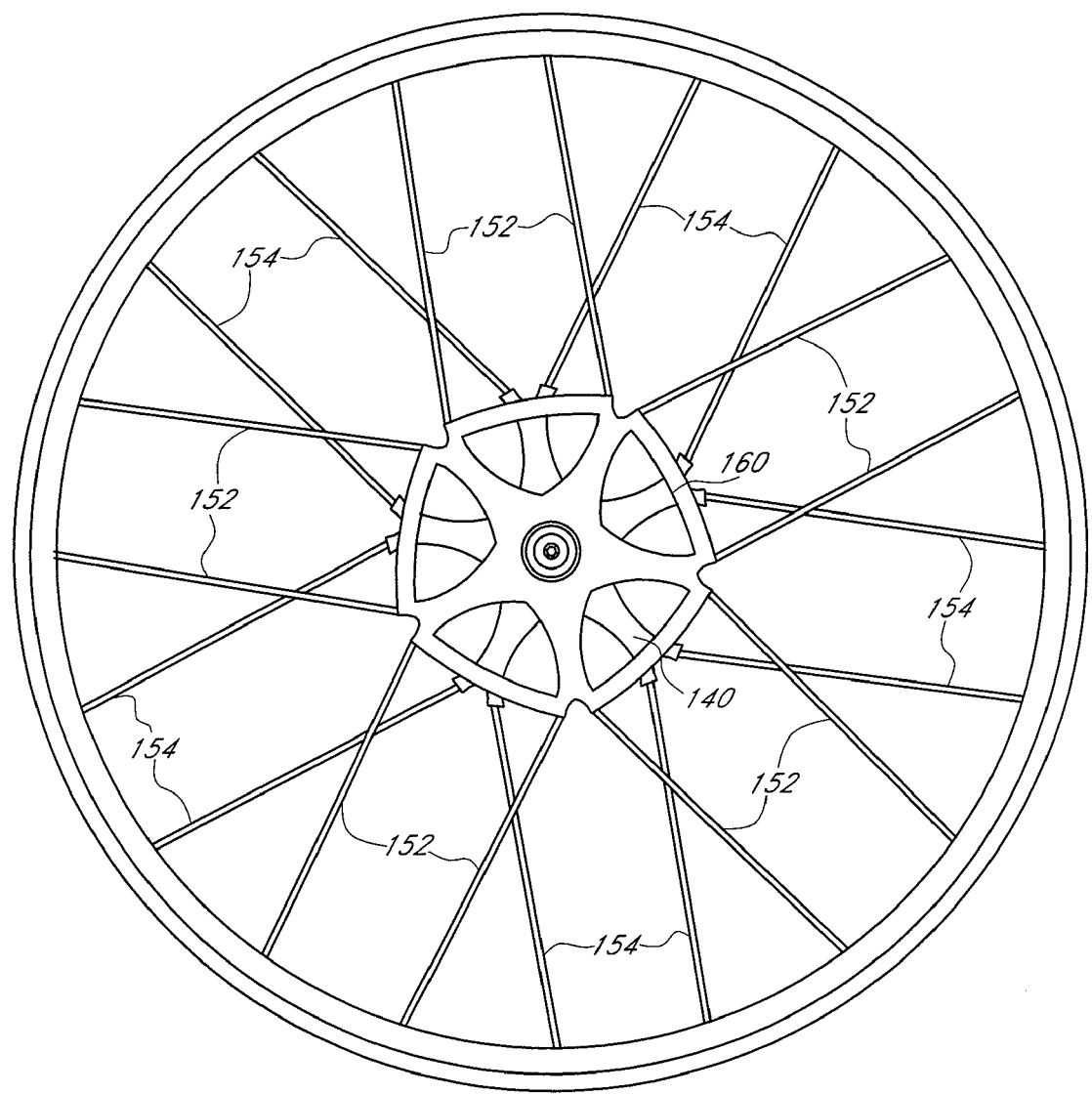
FIG. 6 is a side view of the bicycle wheel assembly of FIG. 5.

With reference to FIGS. 5 and 6, other embodiments of a bicycle wheel 100 having a flanged hub are illustrated. With a non-driven wheel of a bicycle (typically the front wheel), it is desirable that the wheel has a generally structurally symmetric configuration, as illustrated in the embodiments of FIGS. 1 and 2 where the first and second hub flanges 130, 140 are configured structurally substantially identically to each other. But, with a driven wheel, typically drive forces and torque are applied to one side of the wheel by a drive mechanism, typically a chain-driven gear set connected to one side of the wheel hub. Therefore, it can be desirable that the driven side of the wheel be structurally reinforced to accommodate the forces and torque imparted by the drive mechanism.

In FIGS. 5 and 6, the illustrated embodiments depict a wheel 100 as described above with reference to FIGS. 1 and 2, but further including a reinforcing ring 160 comprising five reinforcing ring segments extending between the extensions 132 of the hub flange. This reinforcing ring 160 can be formed integrally with the first hub flange 130 for a driven wheel, or it may be formed as a separate component that is connected to the wheel using an adhesive, a fastener, a melting technique, a welding technique, or another suitable attachment device or technique.

While a reinforcing ring 160 has been illustrated to reinforce the drive side of a wheel 100, it is contemplated that other hub configurations could be used to achieve the desired reinforcement. For example, structures other than a reinforcing ring 160, such as reinforcing ribs on the hub flange extensions 132, could reinforce the hub flange 130 on the driven side. Alternately, the hub flange 130 on the driven side of a wheel 100 could be formed of a stiffer material than that of the non-driven side. Alternately, the hub flange 130 on the driven side could have more extensions 132 and more spokes 150 than that of the non-driven side. Alternately, the hub flange 130 on the driven side could be thicker than that on the non-driven side. Further, various embodiments of driven wheel having a reduced frontal area and reduced aerodynamic drag are illustrated in FIGS. 10-13.

With continuing reference to FIGS. 5 and 6, an alternative configuration of the spokes 150 is also illustrated. As discussed above with respect to FIGS. 1 and 2, the spokes extend to the rim 110 in an alternating arrangement such that around the rim 110, spokes of the first set of spokes 152 alternate with spokes 150 of the second set of spokes 154. FIGS. 5 and 6 illustrate an alternating paired arrangement of spokes, wherein two spokes from the first set 152 of spokes 150 reach the rim 110 alternating with two spokes 150 from the second set 154 of spokes 150. The alternating spoke arrangement illustrated in FIGS. 1 and 2 may result in a more even distribution of wheel loading between the hub flanges 130, 140 than the paired arrangement illustrated in FIGS. 5 and 6. However, it is contemplated that either the alternating arrangement or the paired arrangement may be used in a wheel 100 having pairs of spokes 150 extending from hub flange extensions 132, 142.

Figure 7:
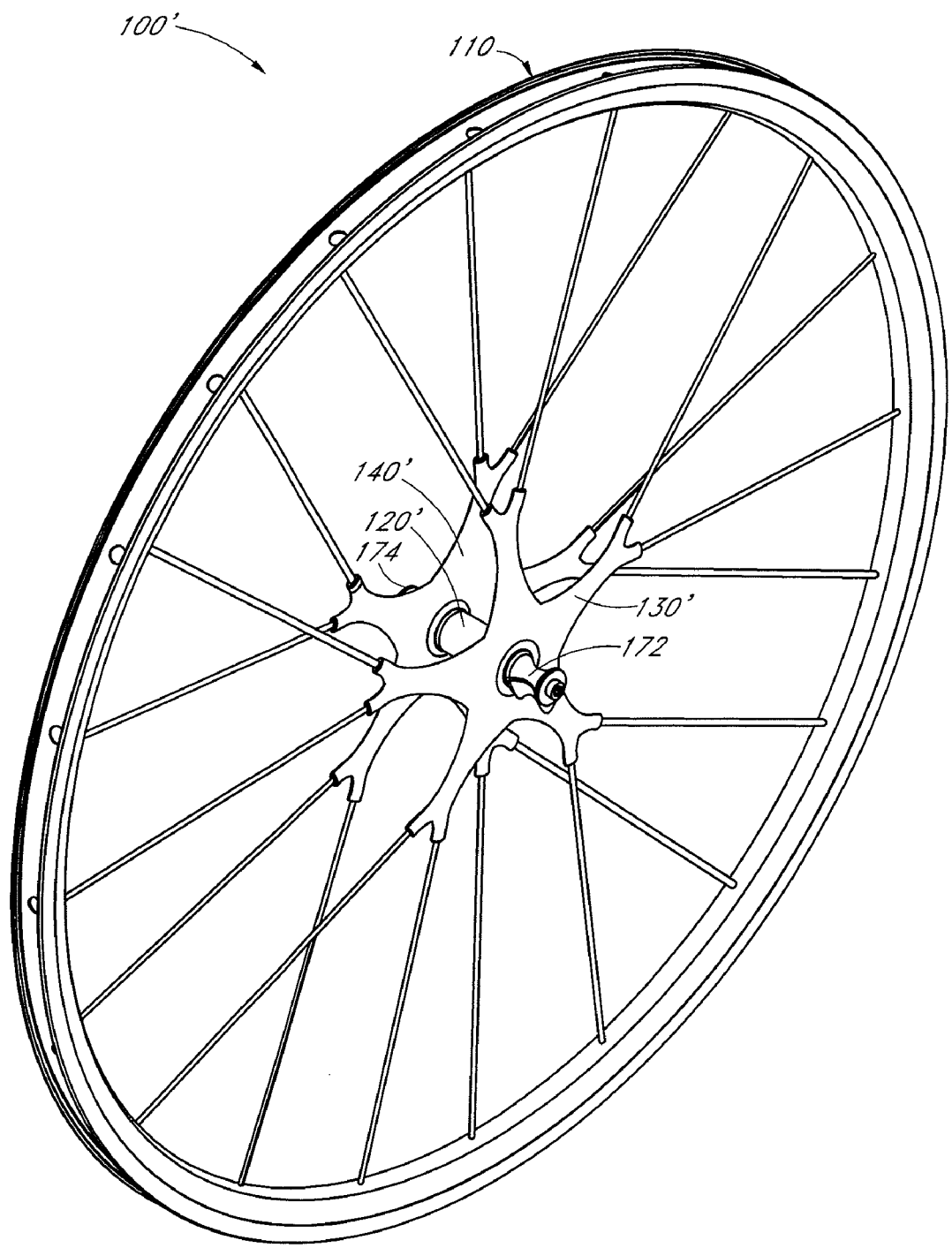
FIG. 7 is a perspective view of an embodiment of bicycle wheel assembly having a reduced frontal area.
Figure 8:
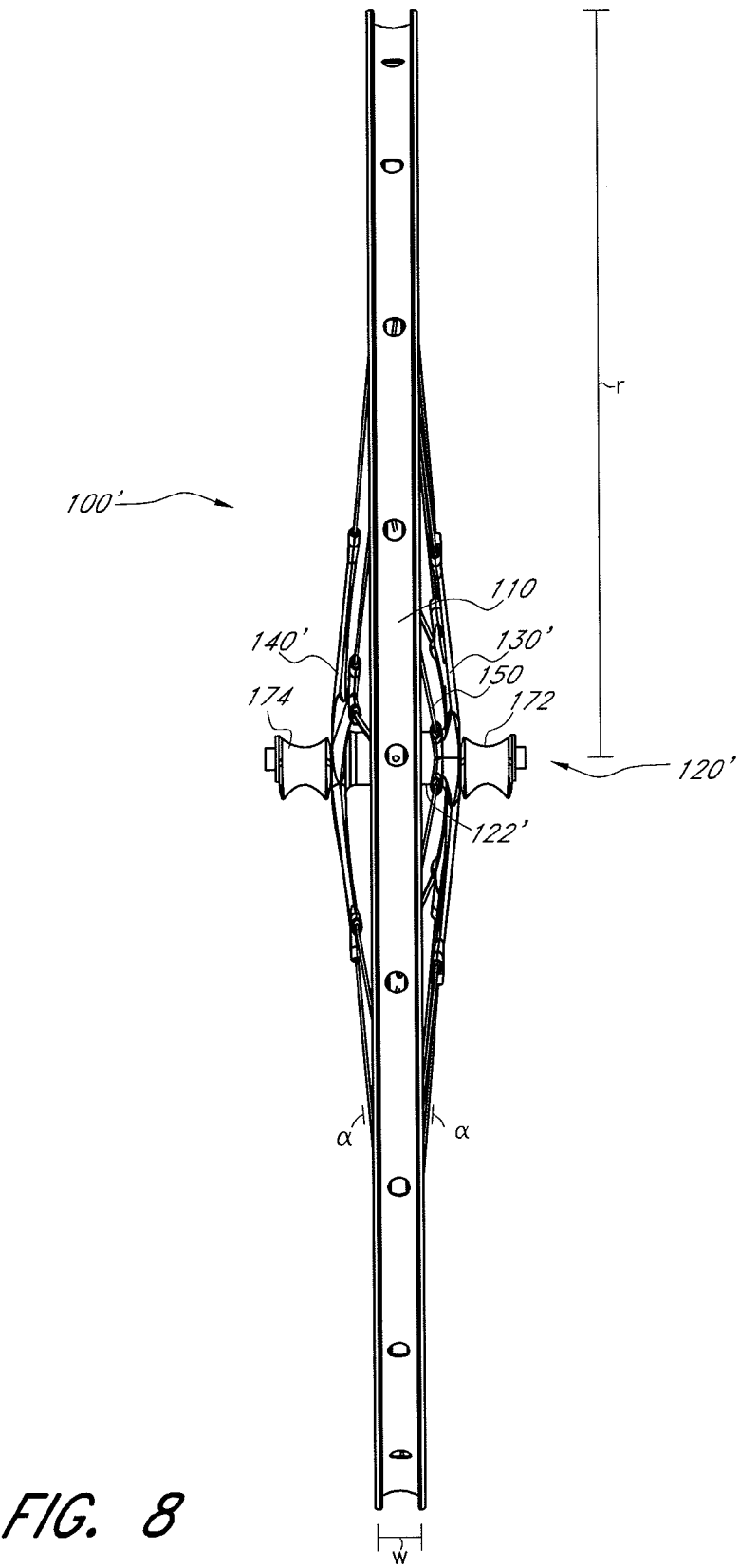
FIG. 8 is a front view of the bicycle wheel assembly of FIG. 7.
Figure 9:
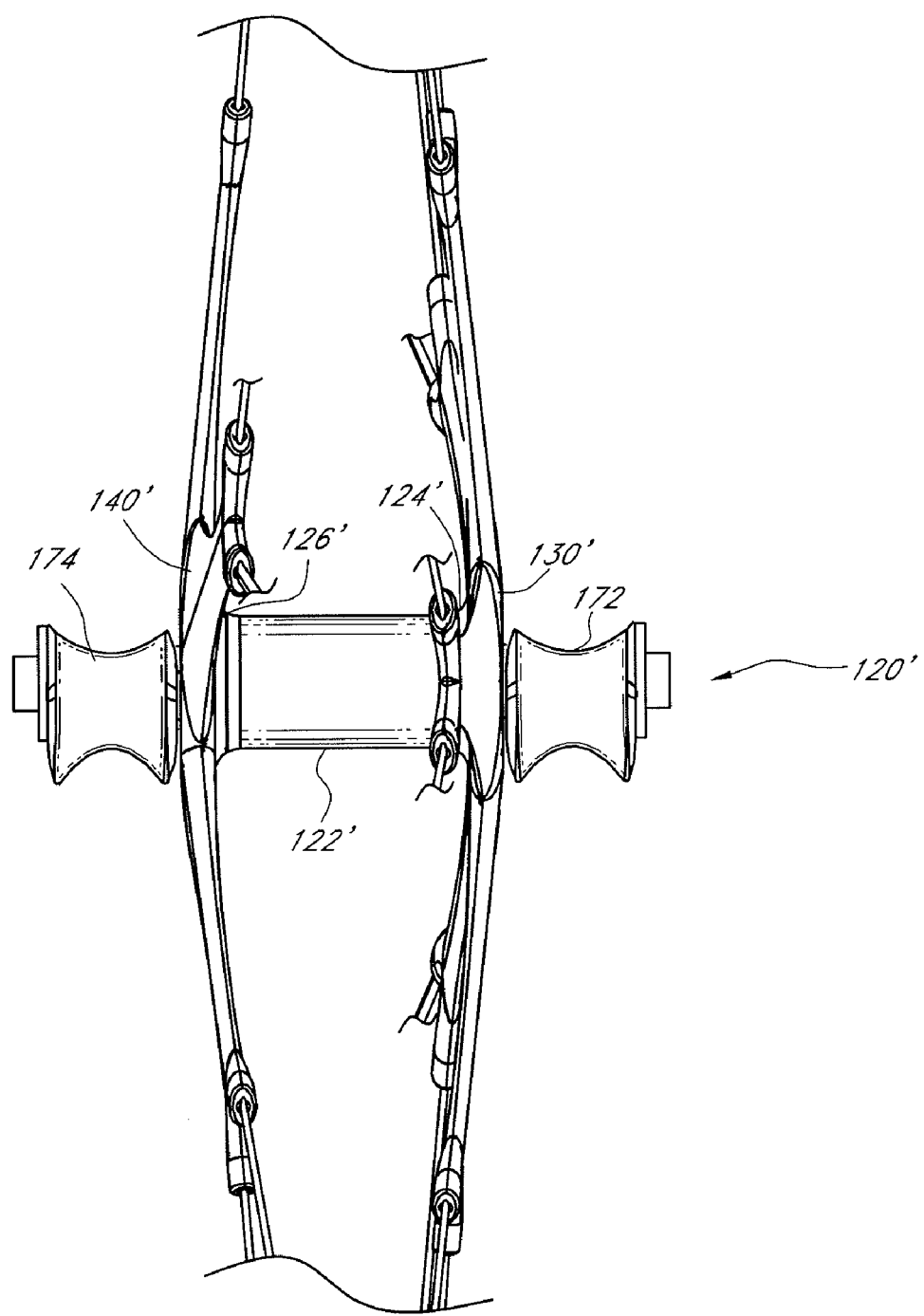
FIG. 9 is a detail front view of the bicycle wheel assembly of FIG. 7.
Figure 10:
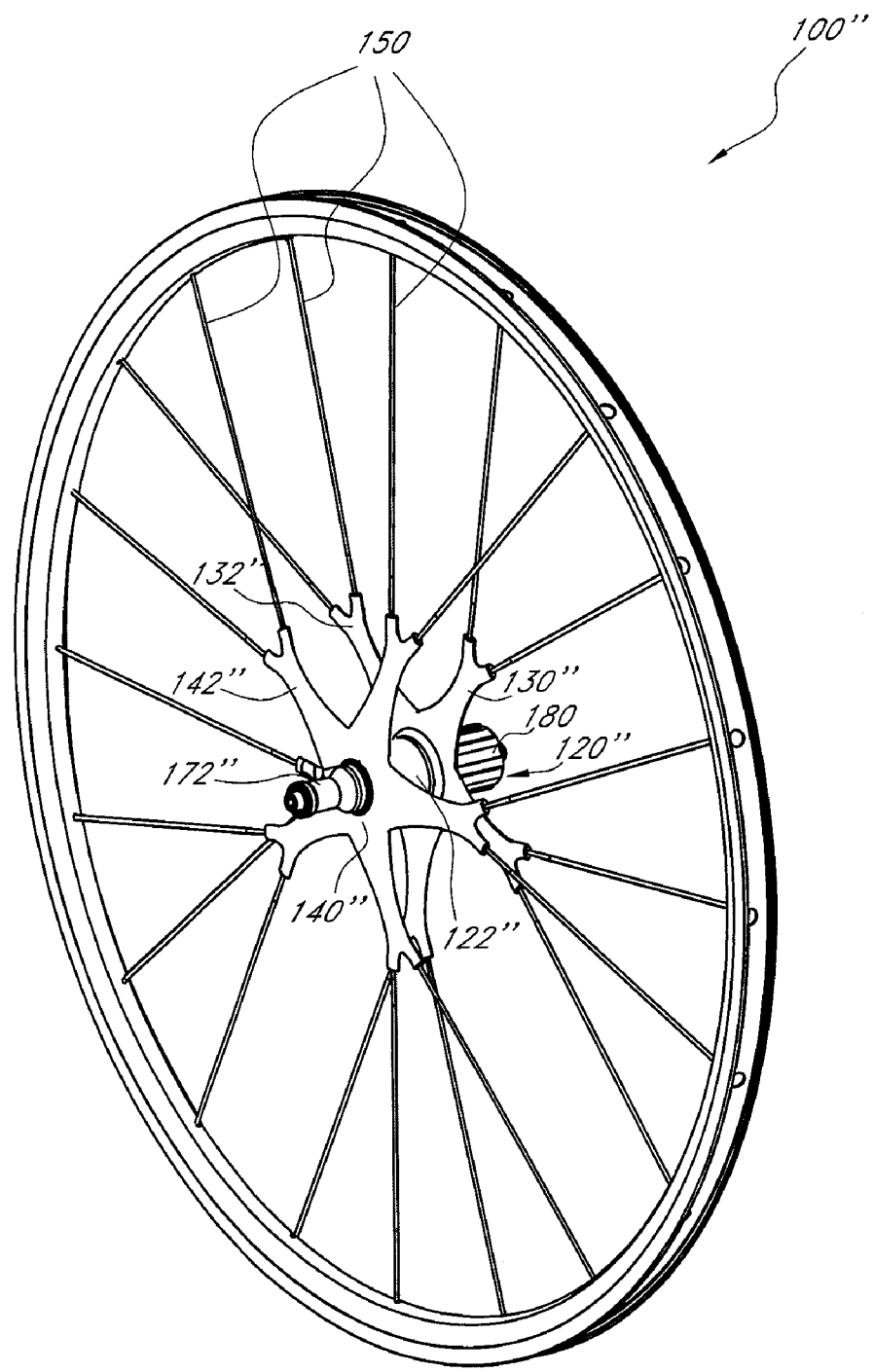
FIG. 10 is a perspective view of an embodiment of bicycle wheel assembly having a reduced frontal area and configured for use as a rear wheel.

With reference to FIGS. 7 through 13, various embodiments of bicycle wheel with reduced aerodynamic drag are illustrated. FIGS. 7 through 9 illustrate a bicycle wheel having a generally laterally symmetric configuration for use as a non-driven wheel. FIGS. 10-13 illustrate a bicycle wheel assembly having reduced aerodynamic drag and configured to be a driven wheel.

FIG. 7 illustrates a perspective view of a wheel having reduced aerodynamic drag. FIG. 8 illustrates a front view of the wheel of FIG. 7, and FIG. 9 illustrates the hub 120' of the wheel. As discussed above, increases in lateral stiffness of a wheel are gained by the incorporation of radially extended hub flanges 130', 140', shortened spokes 150, and a pairs of spokes joining hub flange extensions 132', 142'.

Another factor that contributes to lateral stiffness of a wheel is the width of the hub. In a traditional spoked wheel 200, as illustrated in FIG. 21, spokes 250 are joined to the hub 220 at its outermost ends, adjacent where the hub 220 is configured to join a bicycle frame fork. Extending the spokes 250 to the laterally outer edges of the hub 220 contributes to the lateral stiffness of the wheel 200 as the spokes 250 and the hub 220 effectively form a triangular truss. The hub 220 defines the base of the triangular truss, with a wider base leading to increases in lateral stiffness of the wheel 200. However, aerodynamic drag on a bicycle wheel is proportional to a frontal area of the wheel. The frontal area of a wheel is defined by a front surface area that is exposed to air resistance by the wheel on a moving bicycle. Therefore, the frontal area of a bicycle wheel is a cross sectional surface area of the wheel in rotation projected onto a sectional plane generally perpendicular to a direction of travel of the bicycle. The frontal area of a traditional bicycle wheel can be approximated as the surface area of a generally diamond-shaped figure consisting of two generally isosceles triangular sections each bounded by the hub 220 and the rotational sweep passing through the sectional plane of spokes 250 extending from either end of the hub 220 towards the rim 210. Therefore, for a wheel rim 210 of a given diameter, increasing the width of the attachment of the spokes 250 to the hub 220 increases the frontal area of the wheel. Thus, extending the spokes 250 to outermost ends of the hub 220 contributes to lateral stiffness of the wheel 200, but this extension also contributes to a high frontal area for the wheel, thereby increasing aerodynamic drag.

In the wheel embodiments illustrated in FIGS. 7-9, the hub comprises a central body 122' having a first end 124' and a second end 126', a first hub flange 130' extending radially outward from the central body 122' near the first end 124', and a second hub flange 140' extending radially outward from the central body 122' near the second end 126'. The hub 120' further comprises a first aerodynamic connector 172 configured to extend from the first end 124' of the central body 122'. The first aerodynamic connector 172 is configured to couple to a frame fork of a bicycle. The hub 120' further comprises a second aerodynamic connector 174 configured to extend from the second end 126' of the central body 122'. The second aerodynamic connector 174 is also configured to couple to a frame fork of a bicycle. The central body 122' and the first and second aerodynamic connectors 172, 174 are sized and configured such that the bicycle wheel has a reduced frontal area. That is, the hub flanges 130', 140' extend from the central body 122' of the hub 120' from locations sufficiently laterally inward of a bicycle frame fork connection location to reduce the frontal area of the bicycle wheel.

A reduction of hub width in a traditional spoked wheel 200 would likely result in a wheel with an undesirably reduced amount of lateral stiffness. However, as discussed above, in the illustrated embodiments, lateral wheel stiffness is enhanced through extended hub flanges 130', 140', shortened spokes 150, and hub flange extensions 132', 142' with paired spokes. Therefore, the width of the central body 122' of the hub 120' can be reduced while the wheel 100' still provides an equivalent or greater amount of lateral stiffness than a similarly sized traditional spoked wheel 200 (FIG. 21). A wheel 100' with a desirable reduction in aerodynamic drag can thus be achieved without an undesirable reduction in lateral stiffness.

The total width of the hub 120' comprises the combined widths of the aerodynamic connectors 172, 174 and the central body 122'. Desirably the width of the central body 122' is approximately ½ to ¾ of the total width of the hub 120'. Thus, the combined width of the aerodynamic connectors 172, 174 is approximately ¼ to ½ of the total width of the hub 120'. Therefore, in a wheel 100 having a hub 120' with approximately 80 mm in total width, the aerodynamic connectors 172, 174 are each desirably between approximately 10 mm to 20 mm wide, and are desirably approximately 15 mm wide. The central body 122' of the hub 120' is correspondingly reduced by approximately 20 mm to 40 mm, and preferably by approximately 30 mm. A reduction of width of a central body 122' of a hub 120' from approximately 80 mm to approximately 50 mm results in an approximate halving of the frontal area of the wheel 100'. The narrowed central body 122', and corresponding reduction in frontal area can be viewed in the front views of FIGS. 8 and 9.

In embodiments of wheel 100' with a narrowed central body 122', providing both a reduced frontal area and sufficient lateral stiffness, various wheel 100' components are desirably sized and configured to achieve the desired aerodynamic and stiffness properties. For example, in certain embodiments, an interior width of the rim 110, w, (FIG. 8) is desirably between ⅓ and ⅔ of the width of the central body 122'. In certain embodiments, a radius of the wheel 100', r, from a center of rotation to a radially outer edge of the rim 110 is desirably approximately 5 to 7½ times the width of the central body 122' of the hub 120'.

The hub flanges 130', 140' have extensions 132', 142' extending radially outward from the central body 122' towards the rim 110. As noted above, the extensions 132', 142' contribute to the lateral stiffness of the wheel 100'. Therefore, the extensions 132', 142' may be sized to provide enhanced lateral stiffness in embodiments where the central body 122' has been narrowed. One measure of the relative narrowing of the central body 122' is the convergence angle, α, (FIG. 8) between the spokes extending from the first hub flange 130' and spokes extending from the second hub flange 140'. In certain embodiments, where the convergence angle α has been narrowed to approximately 10 degrees to 12 degrees, the extensions 132' extend at least approximately one-fifth the distance from the central body 122' to the rim 110. In other embodiments, where the convergence angle α has been narrowed to approximately 7 degrees to 9 degrees, the extensions 132' extend at least approximately one-third the distance from the central body 122' to the rim 110. Preferably, the extensions 132' protrude radially outwardly from approximately 80 mm to approximately 120 mm from an outer surface of the central body 122'.

The aerodynamic connectors 172, 174 desirably have an aerodynamic profile such as a rounded hourglass profile as illustrated having a reduced diameter in a center section and a larger diameter at a frame fork end and an inner end. Alternately, the aerodynamic connectors 172, 174 may have a generally cylindrical profile. The aerodynamic connectors 172, 174 may be integrally formed with the hub 120'. Alternatively, the aerodynamic connectors 172, 174 may be formed as individual components that are connected to the wheel hub 120' in an assembly.

As still another alternative, the wheel 100' may not include the aerodynamic connectors 172, 174, and the narrowed central body 122' of the hub 120' could be configured to be mounted directly to a narrowed frame fork, or a single-sided frame fork of a bicycle. Advantageously, a wheel 100' with a narrowed central body 122' enhances the stability of a bicycle with a single-sided frame fork. This enhanced stability as the central body 122' is narrowed, the wheel's mounting location is moved closer to a centerline of the rim 110.

It is contemplated that narrowed hub embodiments of the bicycle wheel 100', 100" could be used as either front or rear bicycle wheels. Where used as a driven wheel, typically a rear wheel, as illustrated in FIGS. 10-13, in certain embodiments, the wheel 100" includes a hub 120" having a central body 122", a first hub flange 130", a second hub flange 140", and a rim 110. The drive side of the wheel 100" is configured to be coupled to a drive mechanism such as a geared chain drive mechanism. As illustrated, the drive side of the wheel 100" includes a cassette freehub 180 that is splined to be mated to a cassette cluster having a mating splined inner surface. Alternatively, the drive side of the wheel 100" could include a threaded flange configured to be coupled to a freewheel having a mating threaded surface.

Figure 11:
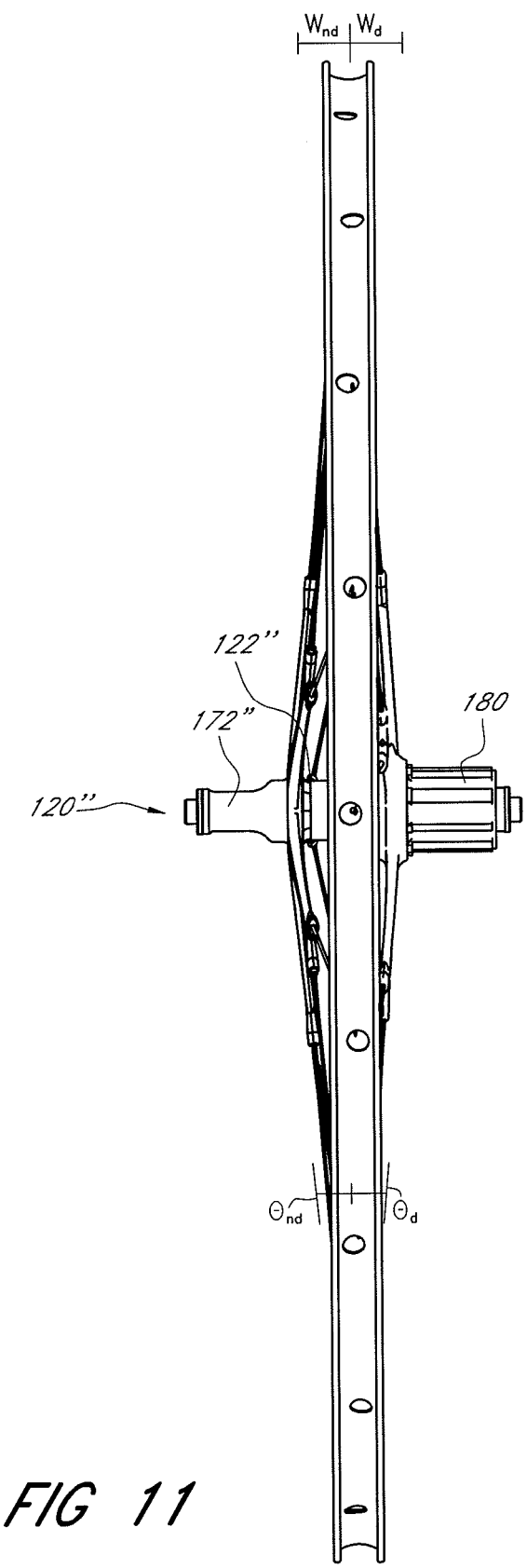
FIG. 11 is a front view of the bicycle wheel assembly of FIG. 10.
Figure 12:
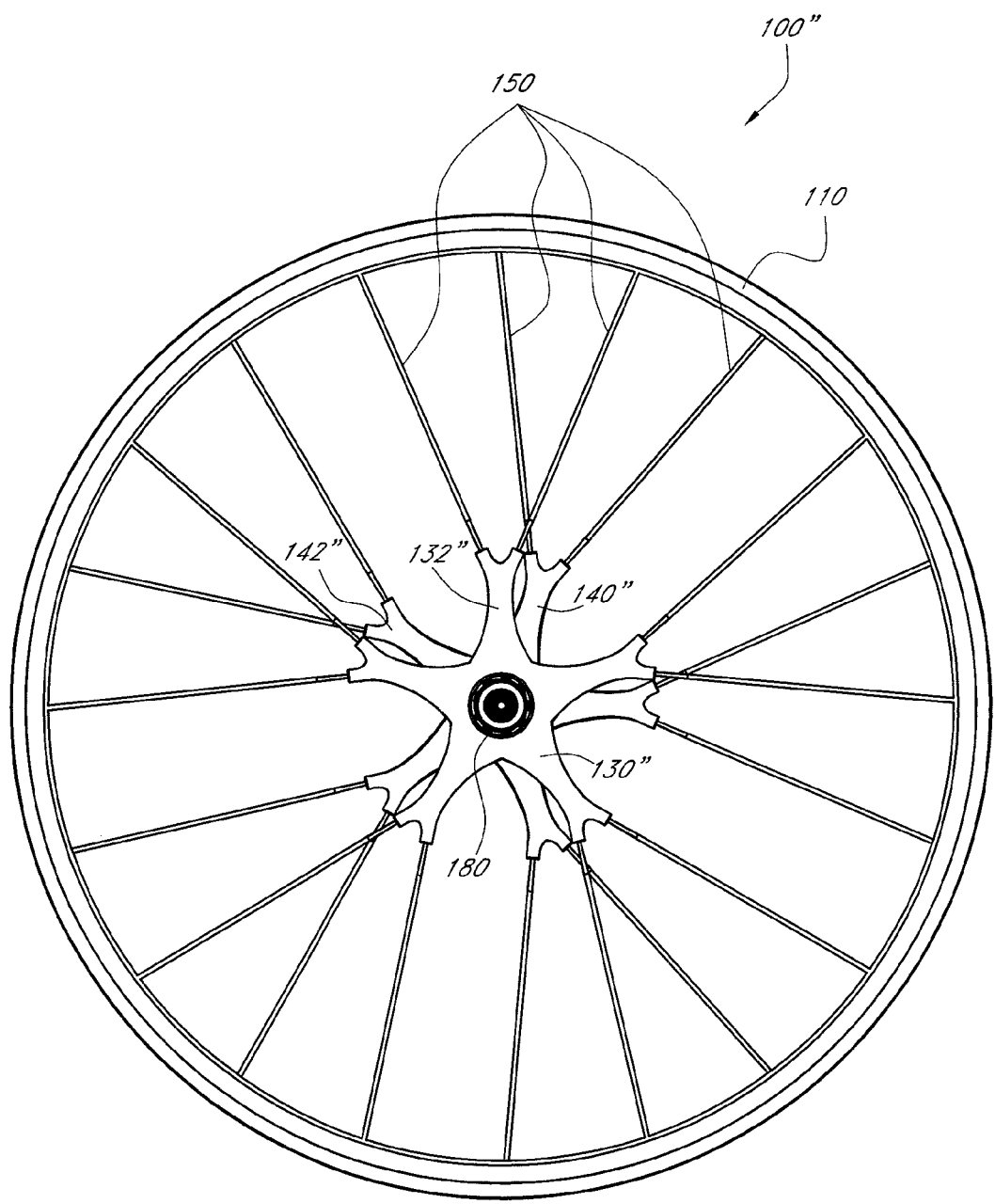
FIG. 12 is a side view of the bicycle wheel assembly of FIG. 10 showing a drive-side of the wheel.
Figure 13:
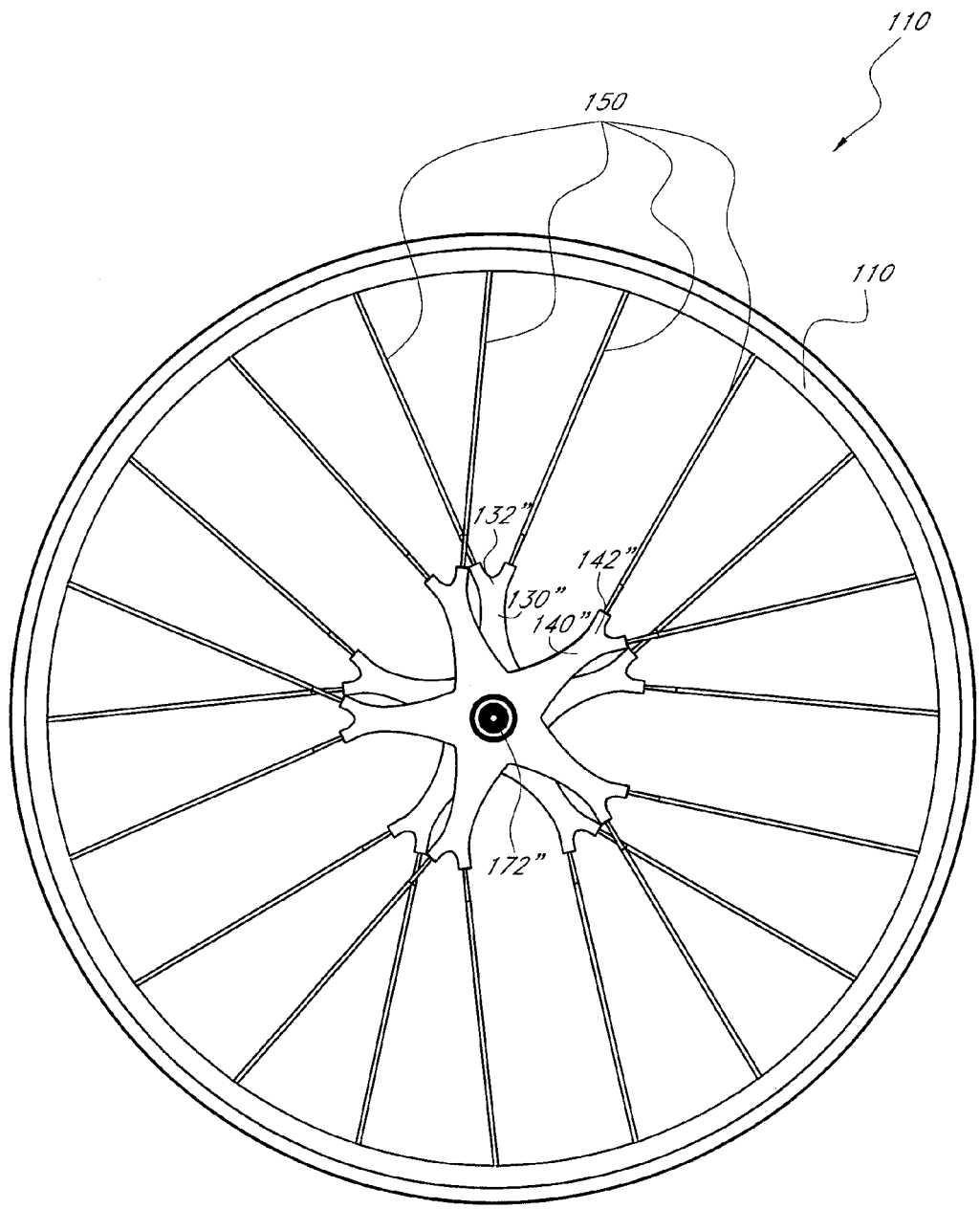
FIG. 13 is a side view of the bicycle wheel assembly of FIG. 10 showing a non-drive side of the wheel.

With reference to FIG. 11, the first and second hub flanges, 130", 140" may be asymmetrically positioned relative to the rim. More specifically, the first hub flange 130", on the driven side of the wheel, may be positioned such that it is closer to a centerline of the rim 110 than the second hub flange 140", on the non-driven side. Desirably, a width, $w_{nd}$ of the second hub flange 140" from a center of the rim 110 is from 1½ to 2½ times a width, $w_d$ of the first hub flange 130" to the rim. Thus, the spokes 150 extending from the first hub flange 130" to the rim 110 form a smaller angle, $\theta_d$, to a vertical axis than the angle, $\theta_{nd}$, relative to vertical formed by the spokes 150 extending from the second hub flange 140" to the rim 110. Desirably, the angle, $\theta_d$ formed by spokes on the driven side of the wheel is from approximately 3.5 to 6 degrees, and the angle, $\theta_{nd}$, formed by the spokes on the non-driven side is from approximately 1.5 to 3 degrees.

A wheel with asymmetrically positioned hub flanges 130", 140" may have a different tension in spokes 150 on the drive side than in spokes 150 on the non-drive side. Undesirably, a wheel having a hub with a longitudinal centerline that is offset from a lateral centerline of rim may be somewhat unstable, performing differently when laterally loaded on the rim from one side than when laterally loaded from the opposite side. But, in a wheel 100" having a reduced frontal area, as the hub central body 122" is narrowed, correspondingly reducing a distance between the hub flanges 130", 140", the tension on the drive side spokes 150 approaches the tension on the non-drive side spokes. Therefore, a driven wheel 100" having a narrowed hub 120" has enhanced stability and exhibits generally similar performance when laterally loaded from either side.

As noted above, with respect to FIGS. 5 and 6, the driven side of a wheel 100 is desirably configured to support additional torques and loads imparted by the drive mechanism. Various aspects of the structural configuration of the embodiments of wheel 100" depicted in FIGS. 10-13 enhance its stiffness when loaded by a drive mechanism such that no reinforcing ring need be present on the driven side of the wheel 100". Pairs of relatively short spokes 150 extending from hub flange extensions 132", 142" that are configured to support a collective maximum load from both spokes 150 of the pair of spokes 150 contribute to the torsional stiffness of the wheel 100". The hub flange extensions 132", 142" further contribute to the torsional stiffness by providing an offset from the rotational axis of the wheel 100" for the spokes 150. This offset creates a relatively large lever arm over which the torque applied by the drive chain acts. Thus, for a given torque, the force applied to an offset spoke 150 is reduced as compared with a non-offset spoke of a traditional wheel 200 (FIG. 21). Moreover, the nearly-vertical orientation of the drive-side spokes 150, enhances the torsional stiffness of the wheel as the drive-side of the wheel is torsionally loaded during wind up.

A drive wheel having a narrowed hub 120" desirably uses a single aerodynamic connector 172" extending from the non-driven side of the wheel 100" and configured to mount to the frame of the bicycle. The width of the aerodynamic connector 172" is desirably approximately ¼ to ½ of the total hub width and preferably is approximately 38 mm. As depicted, the aerodynamic connector 172" has a generally cylindrical shape. However, it is contemplated that the aerodynamic connector 172" may alternately be shaped with an hourglass profile, a flattened oval shape, or another shape having desired aerodynamic properties. In various embodiments, the aerodynamic connector 172" may be configured to couple with a quick release mechanism to allow the driven wheel 100" to be easily installed and removed from the bicycle.

In certain embodiments, a bicycle wheel can include a release mechanism to allow a driven or non-driven bicycle wheel to be easily installed or removed from the bicycle. Advantageously, in embodiments of wheel described above that have a reduced frontal area, most or substantially all of the release mechanism can be sized and configured to fit between the dropouts of a front frame fork for a front wheel embodiment or dropouts on the frame for a rear wheel embodiment. Advantageously, this compact inboard placement of the release mechanism presents a reduced surface area to airflow over a bicycle as compared with a quick release mechanism that extends beyond the dropouts. Additionally, an inboard release mechanism can be less likely to be snagged by roadside debris or off road obstacles as a rider is cycling. However, other embodiments of release mechanism can be positioned outboard of the dropouts.

Figure 14:
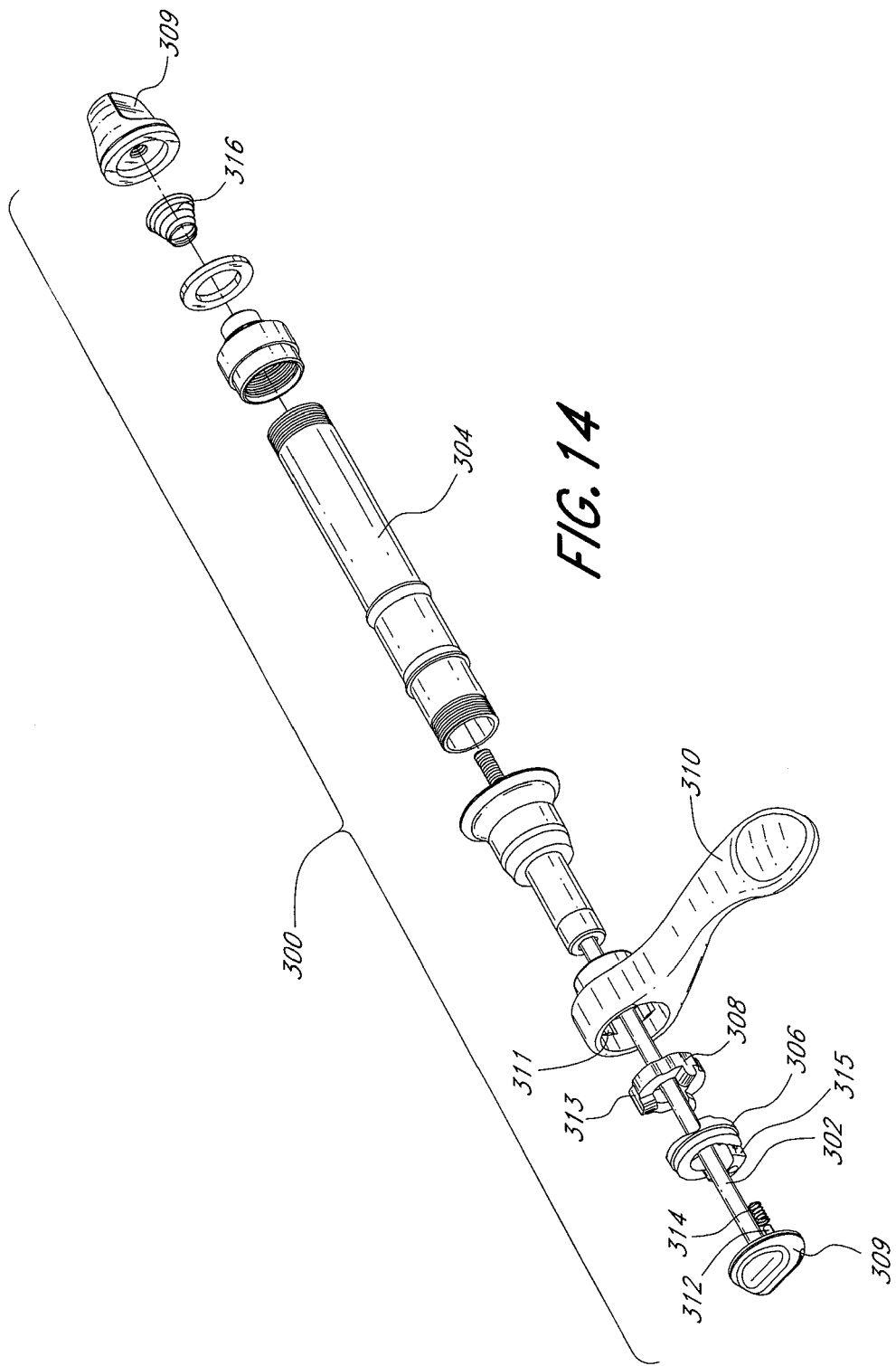
FIG. 14 is an exploded perspective view of a bicycle wheel release mechanism for a front wheel.
Figure 15:
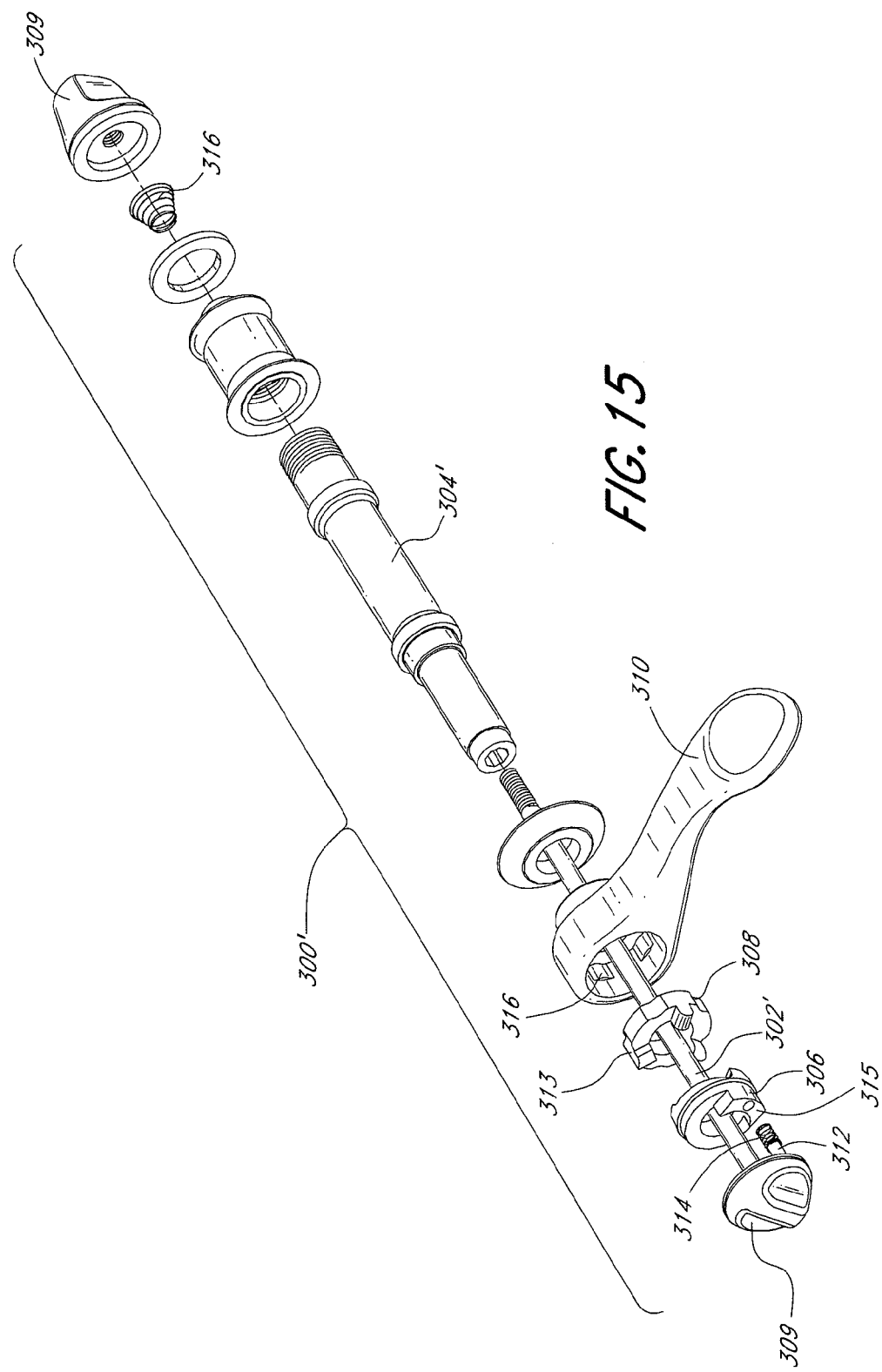
FIG. 15 is an exploded perspective view of a bicycle wheel release mechanism for a rear wheel.

With reference to FIGS. 14 and 15, exploded perspective views of a bicycle wheel release mechanism for a front wheel (FIG. 14) and a rear wheel (FIG. 15) are depicted. It is contemplated that in some embodiments, the front and rear wheel release mechanisms comprise substantially similar components and operate in a substantially similar manner. In other embodiments, front and rear wheel release mechanisms may differ from each other. In still other embodiments, only one of the bicycle wheels can be coupled to the bicycle with a wheel release mechanism. The other wheel can be coupled to the bicycle with couplers such as end nuts on an axle that can require tools to couple or decouple the wheel from the bicycle.

In the embodiment of FIG. 14, the release mechanism 300 is configured to releasably couple an axle of a bicycle wheel to a bicycle. The release mechanism comprises a skewer 302 configured to pass through the axle 304 of the bicycle wheel, the skewer 302 defining a longitudinal axis; a first engagement member configured to be disposed on the axle 304; and a second engagement member configured to be disposed on the axle 304. The first engagement member defines a radially variable surface such that an axial length of the first engagement member varies for different angular orientations of the first engagement member. The second engagement member defines an interface surface configured to cooperate with the radially variable surface. As further described below with respect to the illustrated embodiments, through interaction of the radially variable surface with the interface surface a total axial length of the first engagement member and the second engagement member can be varied. In the illustrated embodiments, the first engagement member is a ramp member 306, and the second engagement surface is a ramp interface 308. The ramp member 306 and the ramp interface 308 are rotatable relative to each other about the longitudinal axis of the skewer 302. The skewer 302 can have threaded ends to mate with end nuts 309. The end nuts 309 are configured to couple the release mechanism to a pair of dropouts on the bicycle.

In the illustrated embodiments, the release mechanism 300 includes a lever 310 rotationally coupled to the ramp interface 308. It is contemplated that in other embodiments, the lever could be rotationally coupled to the ramp member 306. As illustrated, the lever 310 is rotationally coupled to the ramp interface through the interaction of protrusions 311 on an inner surface of the lever 310 with corresponding recesses 313 on the ramp interface 308. In other embodiments, other structures can be used to rotationally couple the lever 310 to the ramp interface 308. For example, the lever 310 and the ramp interface 308 could be formed as a single unitary piece.

With respect to FIG. 14, the release mechanism 300 is configured to facilitate one-handed operation and adjustment of the release. In the illustrated embodiments, the ramp member 306 is keyed to the bicycle. The ramp member 306 comprises a first key 315 that is configured to couple with a slot on the dropout 400 (see FIG. 17) to resist rotation of the ramp member relative to the dropout 400. In the illustrated embodiments, the end nut 309 adjacent the ramp member 306 comprises a second key 312 that couples with the ramp member 306. This second key 312 is configured to substantially prevent rotation of the end nut 309 adjacent the ramp member and the skewer 302 with respect to the ramp member 306. It is contemplated that other structures could be used to key the ramp member 306 to the bicycle and to key the end nut 309 adjacent the ramp member 306 and the skewer 302 to the ramp member 306. Advantageously, this keying facilitates one-handed operation of the release mechanism by a rider. A rider can rotate the ramp interface 308 with respect to the ramp member 306 with the lever without using a second hand to prevent rotation of the ramp member 306 due to friction between the ramp member 306 and the ramp interface 308. Additionally, a rider can easily adjust the wheel release mechanism 300 by advancing or retracting the end nut 309 opposite the ramp member 306 along the threaded end of the skewer 302 without using a second hand to prevent rotation of the skewer 302. Advantageously, this single-handed operation allows for rapid, easy removal, installation, or adjustment of the wheel without dirtying both hands of a rider. However, in other embodiments, no keying of ramp member 306 to a dropout of the bicycle can be made. In these embodiments, a second lever can be coupled to the ramp member 306. The release mechanism can then be operated by rotating the lever and the second lever in opposite directions relative to one another.

In the embodiments of FIG. 14, the wheel release mechanism includes biasing members 314, 316 to further facilitate rapid installation of the wheel on the bicycle. In the illustrated embodiments, the biasing members 314, 316 are coil springs, although other biasing members could be used in other embodiments. When the wheel release mechanism is in a released position, the biasing members 314, 316 compress the ramp member 306 and the ramp interface 308 onto the axle 304 such that the end nuts 309 are spaced from the ramp member 306 and the ramp interface 308 and the axle 304. This spacing allows a wheel including the release mechanism to be easily slid into dropouts 400 of the bicycle (see, e.g., FIG. 19). Additionally, the springs maintain contact between the ramp member 306 and the ramp interface 308 even when the wheel is not coupled to a bicycle.

With reference to FIG. 15, an embodiment of release mechanism 300' configured for use with a rear wheel of a bicycle is illustrated. The release mechanism 300' comprises the same components as described above with respect to FIG. 14. However, the skewer 302' and the axle 304' can be sized and configured for use with a driven wheel.

Figure 16:
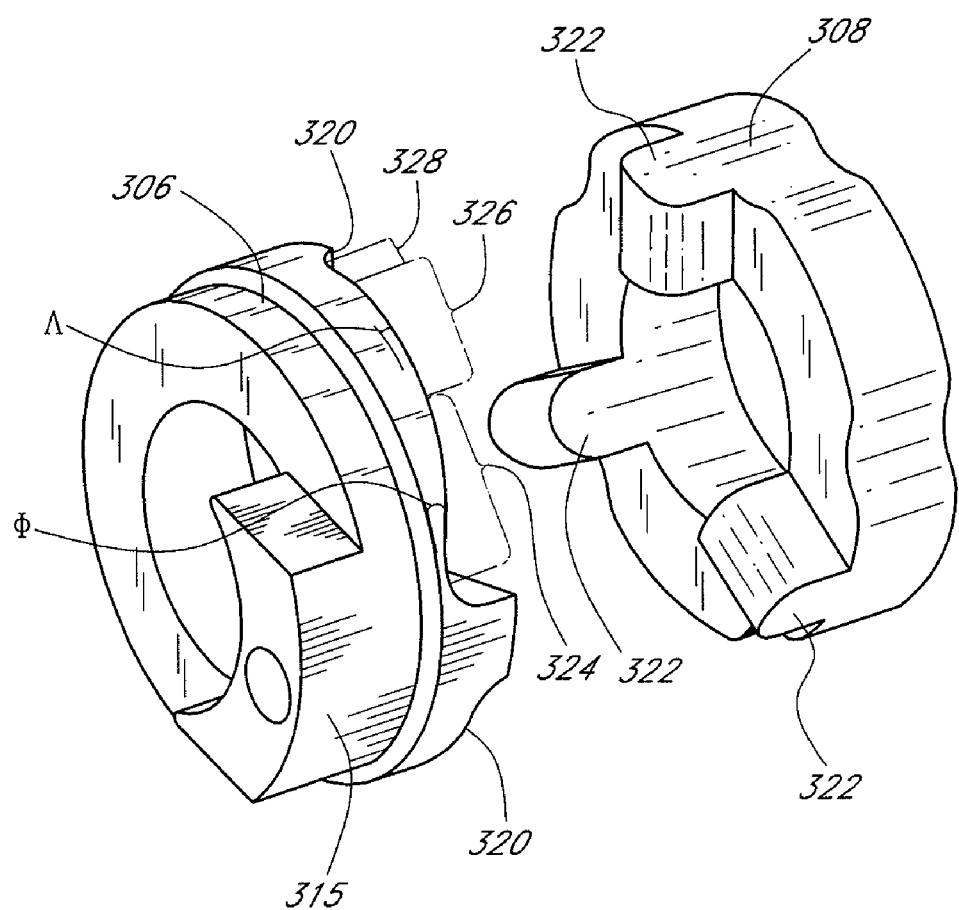
FIG. 16 is an exploded perspective view of a ramp member and a ramp interface of the bicycle wheel release mechanism of FIG. 14 or 15.

With reference to FIG. 16, an exploded perspective view of a ramp member 306 and a ramp interface 308 of the bicycle wheel release mechanism 300, 300' of FIG. 14 or 15 is illustrated. In the illustrated embodiments, the interaction of the ramp member 306 with the ramp interface 308 determines the position of the release mechanism in a secured or released position. As the ramp member 306 and the ramp interface 308 are rotated relative to one another, a total axial length of the combined ramp member 306 and ramp interface 308 assembly can vary, generally increasing for rotation in one direction and generally decreasing for rotation in the opposite direction. In the illustrated embodiments, the ramp member 306 and the ramp interface 308 are rotatable between a first position in which the release mechanism is configured to retain the bicycle wheel on the bicycle and a second position in which the bicycle wheel is releasable from the bicycle. In the first position, a total axial length of the combined ramp member 306 and ramp interface 308 assembly is desirably near a maximum length, thus putting the skewer 302, 302' (FIGS. 14 and 15) in tension between the end nuts 309 and the bicycle dropouts when the wheel release mechanism is coupled to a bicycle. Desirably, sufficient force to securely hold the wheel on the bicycle without using other fasteners is generated by the release mechanism 300, 300'. Correspondingly, the axle 304, 304' is put in compression when the total axial length is near the maximum length and the wheel release mechanism is coupled to the bicycle. In the second position, the total axial length of the combined ramp member 306 and ramp interface 308 is desirably at a minimum length and tension on the skewer 302, 302' and compression on the axle 304, 304' are desirably released, thus allowing the wheel to be released from the dropouts of the bicycle.

The ramp member 306 comprises a radially variable surface. In the illustrated embodiments, the radially variable surface comprises at least one ramp 320. Desirably, the ramp member 306 comprises more than two ramps 320. In the illustrated embodiments, the ramp member comprises three ramps 320 that are substantially angularly evenly spaced about an end of the ramp member 306. The ramp interface 308 comprises an interface surface configured to coordinate with the radially variable surface of the ramp member 306. As illustrated, the radially variable surface comprises at least one pin 322. In the illustrated embodiments, the ramp interface 308 comprises three pins 322, each of the pins 322 positioned and configured to maintain contact with a corresponding one of the ramps 320 of the wheel release mechanism 300, 300'. As noted above with respect to FIG. 14, biasing members 314, 316, such as coil springs can maintain contact between the ramp members 306 and the ramp interfaces 308 even when the wheel is removed from the bicycle. Advantageously, a rider does not have to manually align the ramps 320 with the pins 322 when coupling the wheel with the bicycle. It is contemplated that in other embodiments, the ramp interface 308 could have more or fewer pins 322, or other structures, such as mating ramps configured to interface with the ramps 320 on the ramp member 306. Advantageously, a ramp member 306 and ramp interface 308 with three evenly angular spaced contact points applies load evenly to the bicycle wheel and dropout. It is contemplated in some release mechanisms with fewer than three contact points, there can be an uneven loading of the wheel and dropouts and an increased risk that the wheel could rock with respect to the bicycle rather than forming a solidly coupled connection.

As illustrated in FIG. 16, the ramps 320 can be configured to provide desirable coupling characteristics. For example, in the illustrated embodiments, the ramp comprises a first engagement segment 324 having a first engagement angle $\Phi$, a second engagement segment 326 having a second engagement angle $\Lambda$, and a detent 328. As illustrated, the first engagement angle $\Phi$ is greater than the second engagement angle $\Lambda$. The variation of engagement angles $\Phi$, $\Lambda$ along the ramps 320 in the illustrated embodiments is smoothly blended along a length of the ramps 320. However, it is contemplated that in other embodiments, the ramps 320 could have a distinct step or point of angular change between first and second engagement sections 324, 326. Additionally, in other embodiments, there could be more than two engagement sections, or the ramp could have a single engagement section with a relatively constant engagement angle.

As illustrated, the ramps 320 provide an angularly variable engagement surface for the pins 322 such that in operation, a majority of the increase in axial length of the ramp member 306 and ramp interface 308 assembly occurs as the wheel release mechanism is initially rotated from the second position towards the first position. During this initial rotation, in the illustrated embodiments, the pins 322 engage with the first engagement section 324 of the ramps 320. In the illustrated embodiments, rotation of the wheel release mechanism 300, 300' over the first engagement section 324 provides approximately 90% of the increase in axial length between the minimum axial length when the wheel release mechanism 300, 300' is in the second position and the maximum axial length when the wheel release mechanism 300, 300' is near the first position. In other embodiments, rotation of the wheel release mechanism 300, 300' over the first engagement section 324 can provide approximately 80% of the increase in axial length. In still other embodiments, rotation of the wheel release mechanism 300, 300' over the first engagement section 324 can provide approximately 70% of the increase in axial length.

In the illustrated embodiments, as rotation of the wheel release mechanism approaches the first position, less increase in axial length of the ramp member 306 and ramp interface 308 is generated for a given angular rotation of the wheel release mechanism 300, 300' as the pins 322 are contacting the second engagement sections 326 of the ramps. This continued rotation over a relatively shallow engagement angle facilitates the application of a large amount of wheel restraint force. During this second stage of rotation, in the illustrated embodiments, the pins 322 engage with the second engagement sections 326 of the ramps 320. In the illustrated embodiments, rotation of the wheel release mechanism 300, 300' over the second engagement section 324 provides approximately 10% of the increase in axial length of the wheel release mechanism 300, 300'. In other embodiments, rotation of the wheel release mechanism 300, 300' over the second engagement section 326 can provide approximately 20% of the increase in axial length. In still other embodiments, rotation of the wheel release mechanism 300, 300' over the second engagement section 326 can provide approximately 30% of the increase in axial length.

In the illustrated embodiments, on continued rotation of the wheel release mechanism 300, 300' past the second engagement portion 326, the wheel release mechanism 300, 300' reaches the first position in which the pins 322 are resting in the detents 328 of the ramps 320. Desirably, these detents 328 are slightly recessed from a portion of the ramp corresponding to a maximum axial length of the ramp member 306 and ramp interface 308 assembly. This slight recess provides a tactile and often audible cue that the release mechanism has reached its first or secured position. Additionally, this slight recess retains the wheel release mechanism in the first position even when the bicycle is bounced over uneven terrain or the wheel release mechanism contacts other objects.

Figure 17:
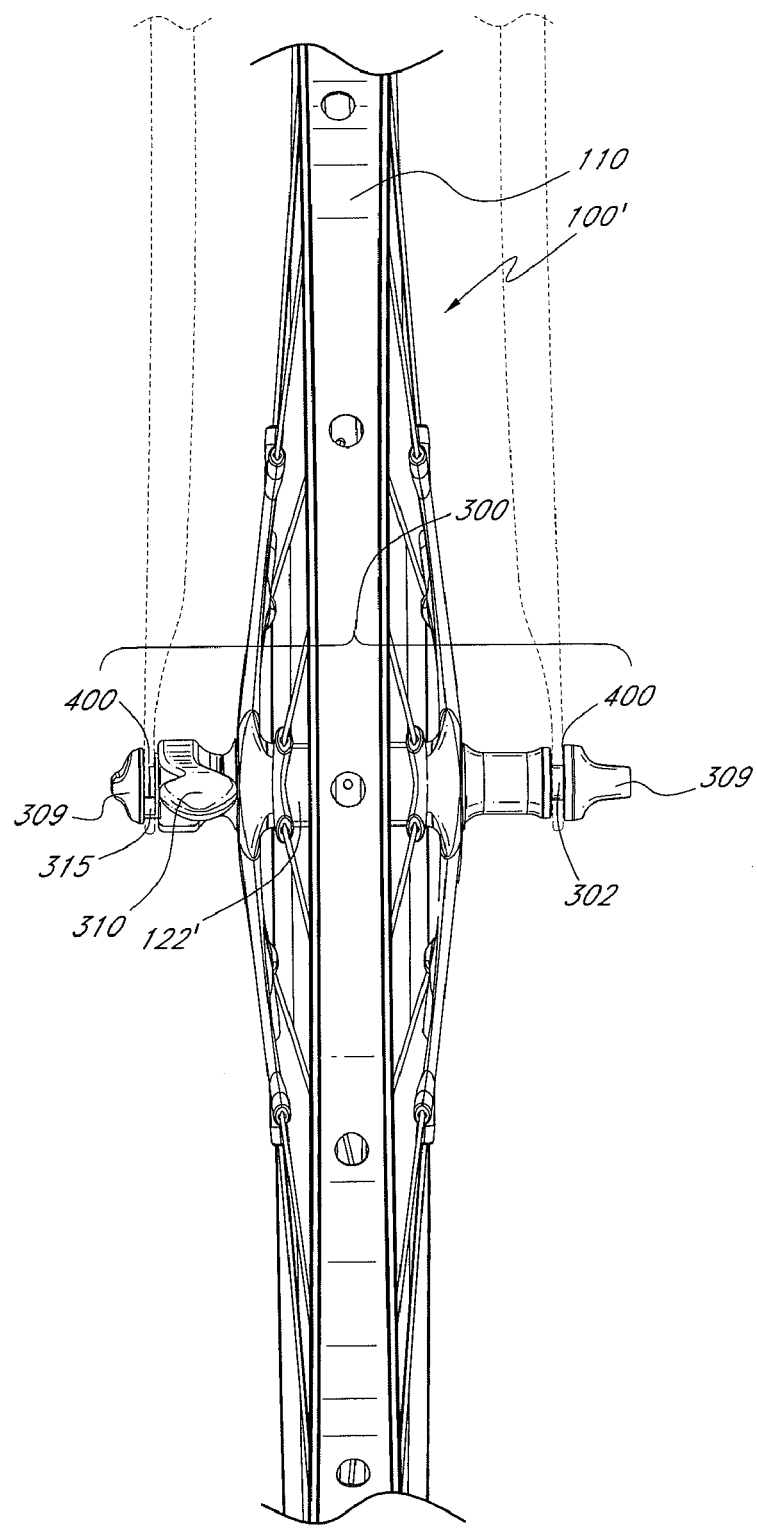
FIG. 17 is a front view of a the bicycle wheel release mechanism of FIG. 14 coupled with the bicycle wheel assembly of FIG. 7, the bicycle wheel release mechanism in a secured position.

With reference to FIG. 17, a wheel 100' including a wheel release mechanism 300 is illustrated coupled to a pair of dropouts 400 of a bicycle. In the embodiment illustrated in FIG. 17, the wheel has a reduced frontal surface area as described above with respect to FIGS. 7-9. As described above, the wheel 100 includes a rim 110 connected to a hub having a central body 122'. However, it is contemplated that in other embodiments, the release mechanism 300 could be used with other wheel configurations, including those without reduced frontal areas. Further, while the release mechanism 300 is illustrated as applied to a front, non-driven wheel, it is contemplated that in other embodiments, the release mechanism 300 can be used with rear or driven wheels.

As illustrated in FIG. 17, the with the exception of the end nuts, the wheel release mechanism 300 fits between the dropouts 400. Advantageously, in the illustrated embodiments where the wheel has a reduced frontal area, the ramp member 306, the ramp interface 308, and the lever 310 (FIG. 14) can be positioned in an area that would otherwise be an aerodynamic spacer 174 (FIG. 9). In embodiments having a more average frontal area, the ramp member 306, ramp interface 308, and the lever can be sized and configured to fit in the space available. In other embodiments, the wheel release mechanism 300 can be configured to fit outside the dropouts 400. As illustrated in FIG. 17, the wheel release mechanism 300 is in the first, or secured, position. The skewer 302 and is held in tension by the end nuts 309. As illustrated, when the release mechanism 300 is in the first position, the lever 310 is pointed towards the rear of the bicycle. Advantageously, this rearward pointing of the lever can provide reduced wind resistance when the bicycle is in motion as compared with other orientations. However, it is contemplated that the position of the lever 310 when the release mechanism 300 is in the first position can be different. For example, where the wheel is a rear or driven wheel, it can be desirable to position the lever pointing towards a front end of the bicycle when the release mechanism 300 is in the first position. This positioning of the lever advantageously reduces the risk that the lever can be contacted by another bicycle as the lever is sheltered behind other components. Moreover, in the illustrated embodiment the position of the lever 310 can be adjusted by disengaging the ramp member 306 from the ramp interface 308, disengaging the lever 310 from the ramp interface 308, rotating the lever 310 to a different alignment of protrusions 311 on the lever and recesses 313 on the ramp interface 308, and restoring contact between the components (FIG. 14).

Figure 18:
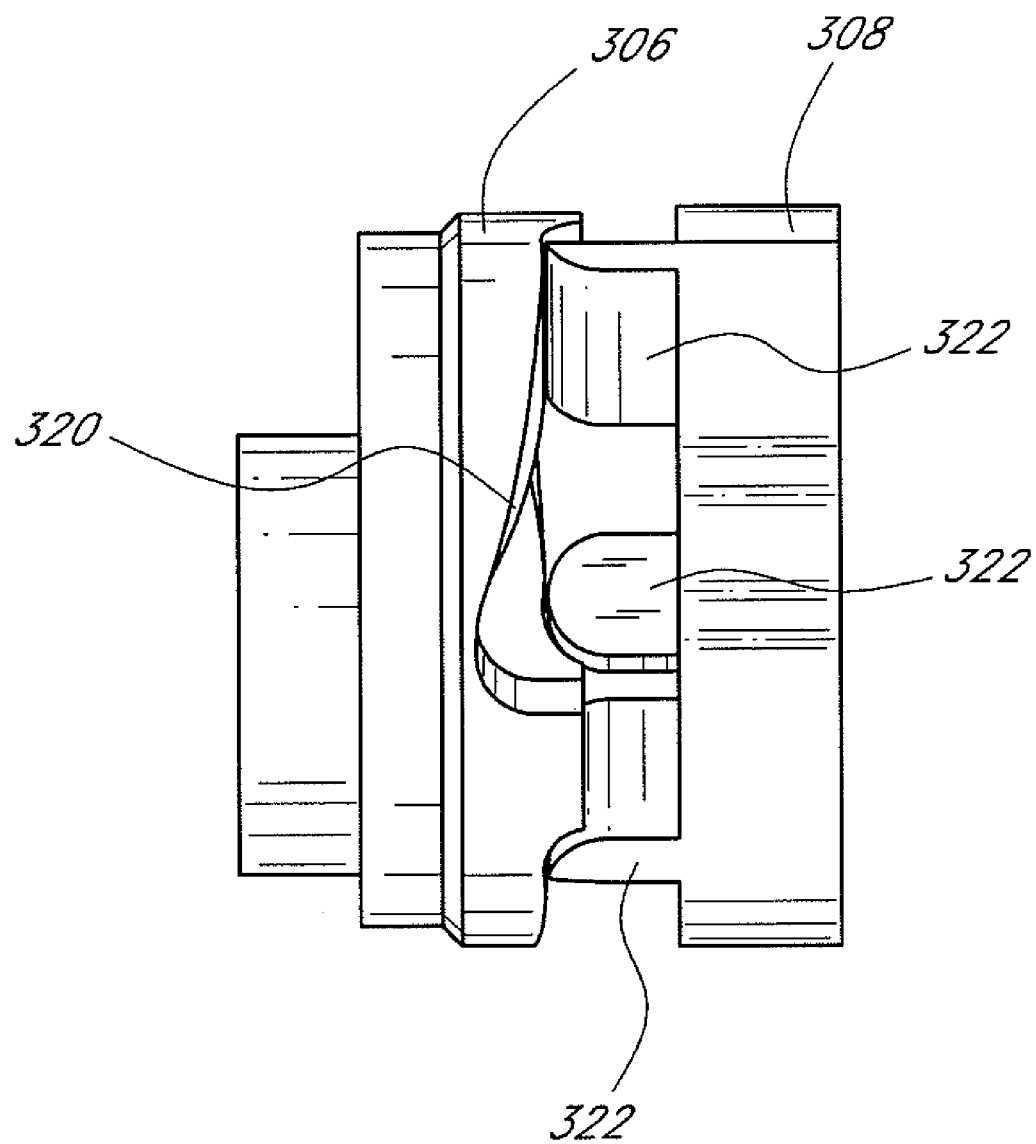
FIG. 18 is a front view of the a ramp member and the ramp interface of the bicycle wheel release mechanism of FIG. 17 in the secured position.

With reference to FIG. 18 a front view of the ramp member 306 and the ramp interface 308 of the bicycle wheel release mechanism 300 is illustrated. As illustrated, the ramp member 306 and the ramp interface 308 are rotated relative to one another such that the axial length of the combined ramp member 306 and ramp interface 308 assembly is near a maximum length. Thus, the ramp member 306 and ramp interface 308 positioning depicted in FIG. 18 corresponds to their rotational orientations when the release mechanism is in the first position as depicted in FIG. 17.

Figure 19:
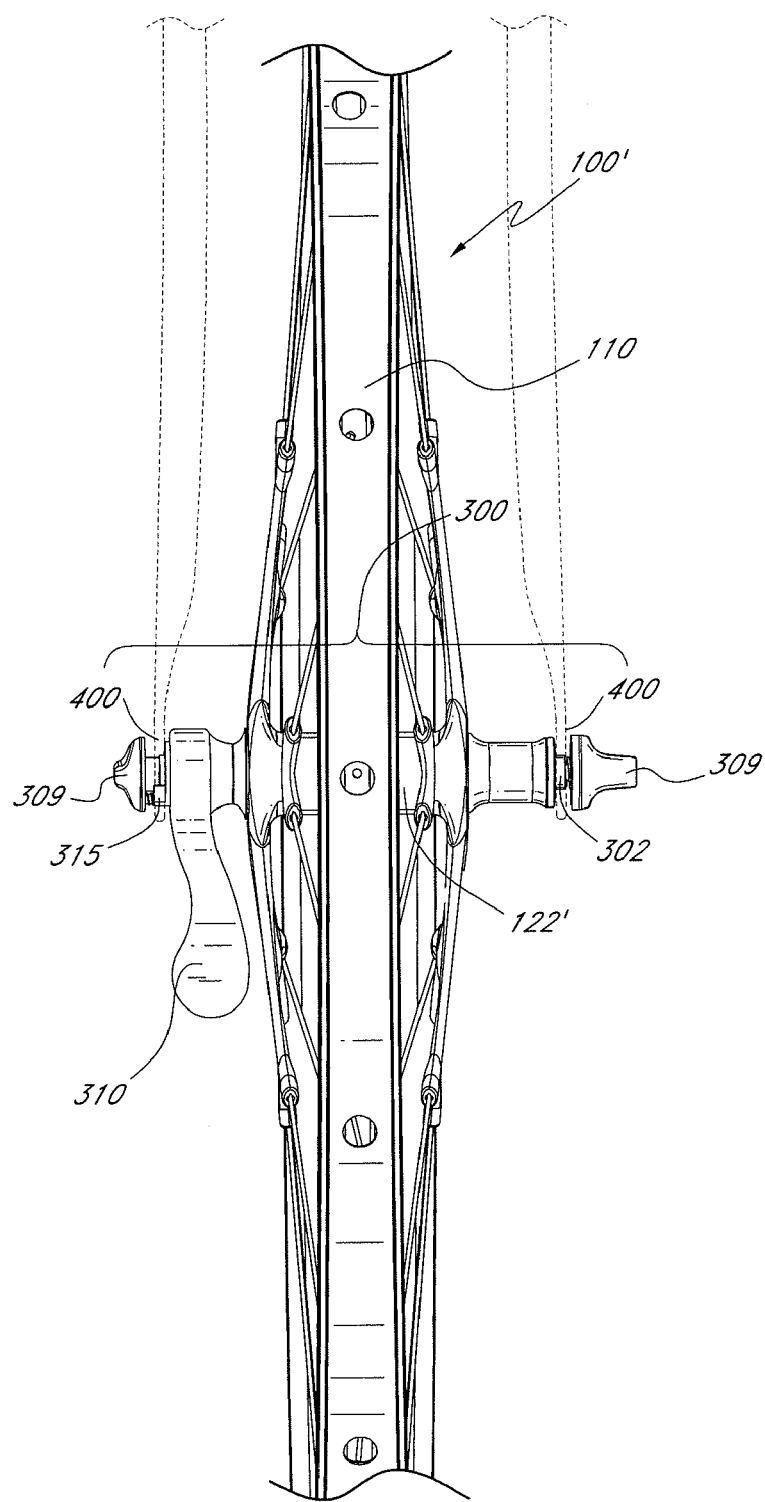
FIG. 19 is a front view of a the bicycle wheel release mechanism of FIG. 14 coupled with the bicycle wheel assembly of FIG. 7, the bicycle wheel release mechanism in a released position.

With reference to FIG. 19, the wheel 100' and release mechanism 300 of FIG. 17 is illustrated with the wheel release mechanism 300 in the second or open position. As discussed above with respect to FIG. 14, biasing members create spacing on the skewer 302, allowing the end nuts 309 to be spaced from other release mechanism 300 components. Thus, when replacing the wheel 100' on the dropouts 400, no manual repositioning positioning of the release mechanism is necessary to appropriately align the dropouts 400 with the axle as the biasing members maintain open spaces near the end nuts 309.

Figure 20:
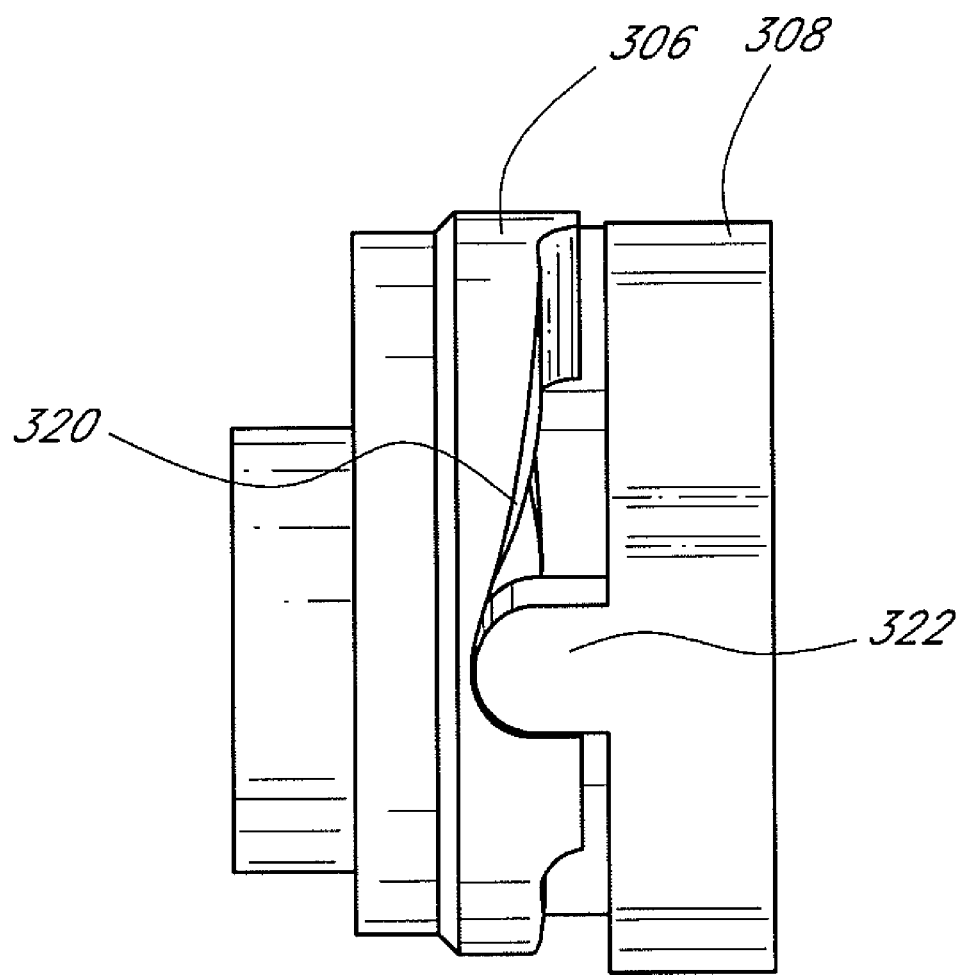
FIG. 20 is a front view of the a ramp member and the ramp interface of the bicycle wheel release mechanism of FIG. 17 in the released position.

With reference to FIG. 20 a front view of the ramp member 306 and the ramp interface 308 of the bicycle wheel release mechanism 300 is illustrated. As illustrated, the ramp member 306 and the ramp interface 308 are rotated relative to one another such that the axial length of the combined ramp member 306 and ramp interface 308 assembly is at a minimum length. Thus, the ramp member 306 and ramp interface 308 positioning depicted in FIG. 20 corresponds to their rotational orientations when the release mechanism is in the second position as depicted in FIG. 18.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Further, the various features of this invention can be used alone, or in combination with other features of this invention other than as expressly described above. Thus, it is intended that the scope of the present invention herein disclosed should not be limited by the particular disclosed embodiments described above, but should be determined only by a fair reading of the claims that follow.

What is claimed is:

1. A release mechanism to releasably couple an axle of a bicycle wheel to a bicycle, the release mechanism comprising:
  a skewer configured to pass through the axle of the bicycle wheel, the skewer defining a longitudinal axis;
  a first engagement member comprising a radially variable surface, the first engagement member configured to be disposed on the axle;
  a second engagement member comprising an interface surface configured to cooperate with the radially variable surface, the second engagement member configured to be disposed on the axle;
  a biasing member located at an end of the skewer and configured to bias the first and second engagement members into engagement; and
  a key being part of one of the first engagement member and the second engagement member;

wherein the first engagement member and the second engagement member are rotatable relative to each other about the longitudinal axis of the skewer and wherein the first engagement member and the second engagement member are rotatable between a first position in which the release mechanism is configured to retain the bicycle wheel on a pair of dropouts on the bicycle and a second position in which the bicycle wheel is releasable from the bicycle, the key configured to prevent relative motion with a keyway on one of the dropouts such that when key and keyway are engaged said one of the first and second engagement members is prevented from rotation with respect to the dropout.

2. The release mechanism of claim 1, wherein the first engagement member comprises a ramp member and wherein the radially variable surface comprises three ramps positioned on the ramp member, each ramp comprising an engagement segment and a detent.

3. The release mechanism of claim 2, wherein the second engagement member comprises a ramp interface and wherein the interface surface comprises three pins, each pin positioned to engage a corresponding one of the three ramps such that the pins are in the detents of the ramp when the release mechanism is in the first position.

4. The release mechanism of claim 3, wherein the engagement segment of the ramp member has a first engagement segment having first engagement angle for initial rotation from the second position and a second engagement segment having a second engagement angle near the detent, and wherein the first engagement angle is greater than the second engagement angle such that greater axial movement of the ramp interface and the ramp member is generated over the first engagement segment than is generated over the second engagement segment.

5. The release mechanism of claim 4, wherein the engagement segment of the ramp member is configured such that approximately 90% of a total axial movement of the ramp interface and the ramp member between the first position and the second position is generated over the first engagement segment, and approximately 10% of a total axial movement of the ramp interface and the ramp member is generated over the second engagement segment.

6. The release mechanism of claim 3, further comprising a lever coupled to one of the ramp member and the ramp interface such that rotation of the lever rotates the ramp interface relative to the ramp member.

7. The release mechanism of claim 6, wherein the one of the ramp member and the ramp interface that is not coupled to the lever is configured to be coupled to the bicycle by the key such that rotation of the lever rotates only one of the ramp member and the ramp interface.

8. The release mechanism of claim 6, wherein the lever extends towards the rear of the bicycle when the release mechanism is in the first position and coupling the wheel to the bicycle and wherein the lever extends vertically downward when the release mechanism is in the second position.

9. The release mechanism of claim 1, wherein the biasing member is configured to maintain the rotational orientation of the first engagement member and the second engagement member when the release mechanism is in the second position.

10. The release mechanism of claim 9, wherein the biasing member is a spring.

11. The release mechanism of claim 1, wherein the first engagement member and the second engagement member are configured to fit between the pair of dropouts when the bicycle wheel is coupled to the bicycle.

12. A release mechanism to releasably couple an axle of a bicycle wheel to a pair of dropouts on a bicycle, the mechanism comprising:
  a skewer configured to pass through the axle of the bicycle wheel, the skewer defining a longitudinal axis; and
  a wheel retention mechanism, including a lever, that is selectively adjustable between a first position in which the release mechanism is configured to retain the bicycle wheel on the dropouts and a second position in which the bicycle wheel is releasable from the dropouts;
  wherein the lever of the wheel retention mechanism is configured to fit between the dropouts on the bicycle when the bicycle wheel is coupled to the bicycle.

13. The release mechanism of claim 12, wherein the wheel retention mechanism comprises:
  a ramp member configured to be disposed on the axle; and
  a ramp interface configured to be disposed on the axle.

14. The release mechanism of claim 13, wherein the ramp member and the ramp interface are rotatable relative to each other about the longitudinal axis of the skewer and wherein the ramp member and the ramp interface are rotatable between a first position in which the release mechanism is configured to retain the bicycle wheel on the bicycle and a second position in which the bicycle wheel is releasable from the bicycle.

15. The release mechanism of claim 14, wherein the lever is coupled to one of the ramp member and the ramp interface such that rotation of the lever rotates the ramp interface relative to the ramp member.

16. The release mechanism of claim 14, wherein the lever is configured to have an aerodynamic profile when the release mechanism is in the first position.

17. A bicycle wheel comprising:
  a wheel rim;
  an axle positioned approximately at a rotational center of the wheel rim;
  a hub;
  a plurality of spokes extending between the hub and the rim;
  a release mechanism to releasably couple the axle of the bicycle wheel to a pair of dropouts on a bicycle, the release mechanism comprising:
    a skewer passing through the axle of the bicycle wheel, the skewer defining a longitudinal axis;
    a lever disposed on the axle and between the pair of dropouts on the bicycle when the axle is coupled to the pair of dropouts;
    a first engagement member comprising a radially variable surface, the first engagement member disposed on the axle; and
    a second engagement member comprising an interface surface configured to cooperate with the radially variable surface, the second engagement member disposed on the axle;
    wherein the first engagement member and the second engagement member are rotatable relative to each other about the longitudinal axis of the skewer and wherein the first engagement member and the second engagement member are rotatable between a first position in which the release mechanism is configured to retain the bicycle wheel on the bicycle and a second position in which the bicycle wheel is releasable from the bicycle.

18. The bicycle wheel of claim 17, wherein the first engagement member and the second engagement member are configured to fit between the pair of dropouts when the wheel is coupled to the bicycle.

19. The bicycle wheel of claim 17, wherein the hub comprises:
- a central body having a first end and a second end;
- a first aerodynamic connector extending axially from one of the first end and the second end of the central body and configured to couple to a wheel fork of a bicycle;
- a first hub flange extending radially outward toward the rim from the central body near the first end, the first hub flange comprising a plurality of extensions, wherein the central body and the first aerodynamic connector are sized and configured such that the wheel has a reduced frontal area.

20. A release mechanism to releasably couple an axle of a bicycle wheel to a pair of dropouts on a bicycle, the mechanism comprising:
- a skewer configured to pass through the axle of the bicycle wheel, the skewer defining a longitudinal axis;
- at least one end nut;
- a biasing member and
- a wheel retention mechanism comprising:
  - a ramp member configured to be disposed on the axle; and
  - a ramp interface configured to be disposed on the axle;
- wherein the wheel retention mechanism is selectively adjustable between a first position in which the release mechanism is configured to retain the bicycle wheel on the dropouts and a second position in which the bicycle wheel is releasable from the dropouts;
- wherein the wheel retention mechanism is configured to fit between the dropouts on the bicycle when the bicycle wheel is coupled to the bicycle and one of either the ramp member or the ramp interface comprising a key configured to fit in a keyway in one of the dropouts and also being biased axially away from the end nut with the biasing member.

21. A release mechanism to releasably couple an axle of a bicycle wheel to a bicycle fork, the release mechanism comprising:
- a skewer configured to pass through the axle of the bicycle wheel, the skewer defining a longitudinal axis;
- a first engagement member comprising a radially variable surface, the first engagement member configured to be disposed on the axle;
- a second engagement member comprising an interface surface configured to cooperate with the radially variable surface, the second engagement member configured to be disposed on the axle;
- a biasing member configured to bias the first and second engagement members into engagement; and
- a key being part of either the first engagement member or the second engagement member;
- wherein the first engagement member and the second engagement member are rotatable relative to each other about the longitudinal axis of the skewer and wherein the first engagement member and the second engagement member are rotatable between a first position in which the release mechanism is configured to retain the bicycle wheel on the bicycle fork and a second position in which the bicycle wheel is releasable from the bicycle fork, the key configured to prevent relative motion with a keyway on the bicycle fork such that when engaged only one of the first and second engagement members can rotate with respect to the bicycle fork.

* * * * *